United States Patent
Prebil et al.

(10) Patent No.: US 10,076,883 B2
(45) Date of Patent: Sep. 18, 2018

(54) SYSTEM AND METHOD FOR MANUFACTURING OFF-AXIS PREPREG MATERIAL

(71) Applicant: The Boeing Company, Chicago, IL (US)

(72) Inventors: Charles R. Prebil, University City, MO (US); James R. Fox, University City, MO (US); Randall D. Wilkerson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 531 days.

(21) Appl. No.: 14/704,804

(22) Filed: May 5, 2015

(65) Prior Publication Data

US 2016/0325509 A1    Nov. 10, 2016

(51) Int. Cl.
*B29C 70/38* (2006.01)
*B29C 31/08* (2006.01)
(Continued)

(52) U.S. Cl.
CPC .......... *B29C 70/386* (2013.01); *B29C 31/085* (2013.01); *B29C 65/18* (2013.01); *B29C 65/7802* (2013.01); *B29C 65/8253* (2013.01); *B29C 66/1142* (2013.01); *B29C 66/345* (2013.01); *B29C 66/435* (2013.01); *B29C 66/72141* (2013.01); *B29C 66/73921* (2013.01); *B29C 66/8169* (2013.01); *B29C 66/81469* (2013.01); *B29C 66/836* (2013.01); *B29C 66/8322* (2013.01); *B29C 70/38* (2013.01); *G01B 11/028* (2013.01); *B29B 11/04* (2013.01); *B29C 65/14* (2013.01); *B29C 65/1412* (2013.01);

(Continued)

(58) Field of Classification Search
CPC ... B29C 65/7802; B29C 70/38; B29C 70/386; G01B 11/028
USPC .................................................. 156/367, 378
See application file for complete search history.

(56) References Cited

U.S. PATENT DOCUMENTS 5,078,592 A * 1/1992 Grimshaw .......... B29C 35/0288
156/359
7,807,005 B2  10/2010 Rubin et al.
(Continued)

FOREIGN PATENT DOCUMENTS

DE    102010031579    1/2012
EP         2377673    10/2011
WO    2008110614     9/2008

OTHER PUBLICATIONS

Translation of DE 102010031579, Jan. 26, 2012.*
Extended European Search Report for EP16165087 dated Oct. 13, 2016.

*Primary Examiner* — George R Koch

(57) ABSTRACT

An off-axis prepreg material manufacturing machine may include a robot configured to position a prepreg piece adjacent to an end of a prepreg layer. The machine may additionally include an alignment system configured to sense a position of the prepreg piece relative to the prepreg layer and generate a position signal representative thereof. The machine may also include a controller configured to receive the position signal and cause the robot to adjust the position of the prepreg piece such that an end edge of the prepreg piece and an end edge of the prepreg layer are in substantially abutting contact.

22 Claims, 30 Drawing Sheets

(51) Int. Cl.
- G01B 11/02 (2006.01)
- B29C 65/18 (2006.01)
- B29C 65/78 (2006.01)
- B29C 65/82 (2006.01)
- B29C 65/00 (2006.01)
- B29K 105/08 (2006.01)
- B29B 11/04 (2006.01)
- B29C 65/14 (2006.01)
- B29C 65/22 (2006.01)
- B29C 65/30 (2006.01)
- B29C 65/32 (2006.01)

(52) U.S. Cl.
CPC .......... *B29C 65/224* (2013.01); *B29C 65/305* (2013.01); *B29C 65/32* (2013.01); *B29C 66/0042* (2013.01); *B29C 66/0062* (2013.01); *B29C 66/341* (2013.01); *B29C 66/71* (2013.01); *B29C 66/7212* (2013.01); *B29C 66/8122* (2013.01); *B29C 66/81261* (2013.01); *B29C 66/8242* (2013.01); *B29C 66/84121* (2013.01); *B29C 66/863* (2013.01); *B29C 66/9161* (2013.01); *B29C 66/91221* (2013.01); *B29C 66/91231* (2013.01); *B29C 66/9241* (2013.01); *B29C 66/92431* (2013.01); *B29C 66/934* (2013.01); *B29C 66/944* (2013.01); *B29C 66/961* (2013.01); *B29C 2793/0081* (2013.01); *B29K 2105/0881* (2013.01)

(56) References Cited

U.S. PATENT DOCUMENTS

| | | |
|---|---|---|
| 8,333,858 B2 | 12/2012 | Rubin et al. |
| 2007/0289700 A1 | 12/2007 | Nelson |
| 2010/0075126 A1 | 3/2010 | Ford |
| 2011/0247743 A1* | 10/2011 | Slack ................. B29C 70/20 156/64 |
| 2012/0330453 A1* | 12/2012 | Samak Sangari ...... B25J 9/1697 700/121 |
| 2013/0217558 A1 | 8/2013 | Glockner |

* cited by examiner

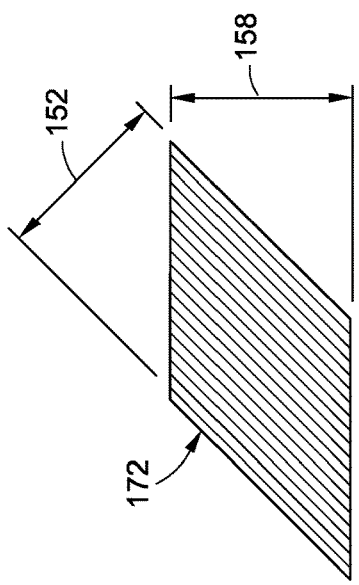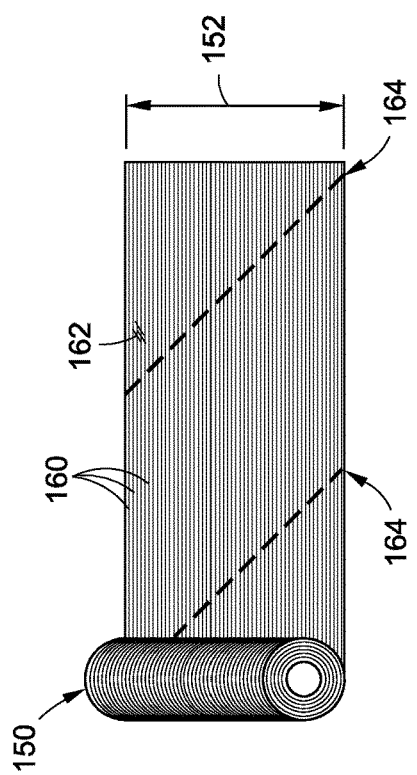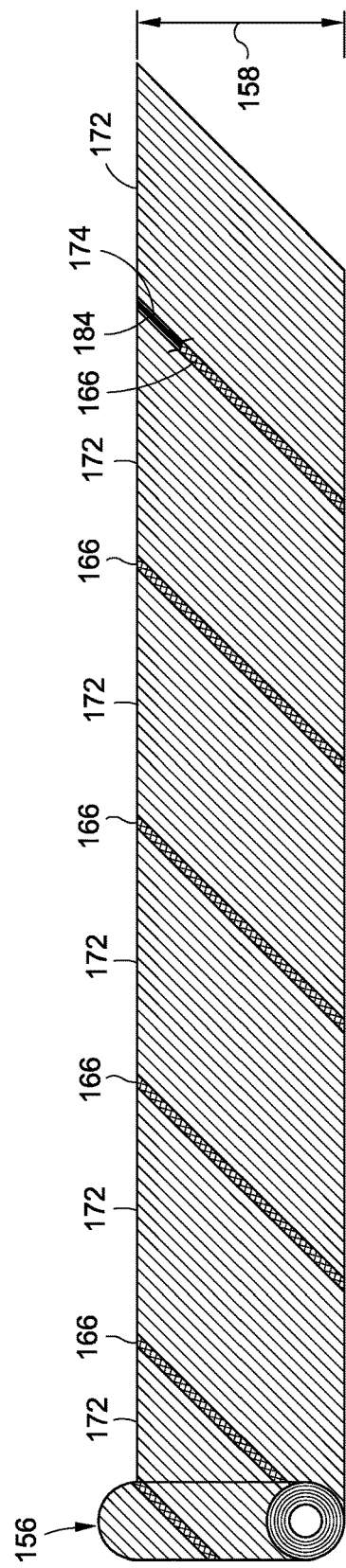
FIG. 10
FIG. 9
FIG. 11

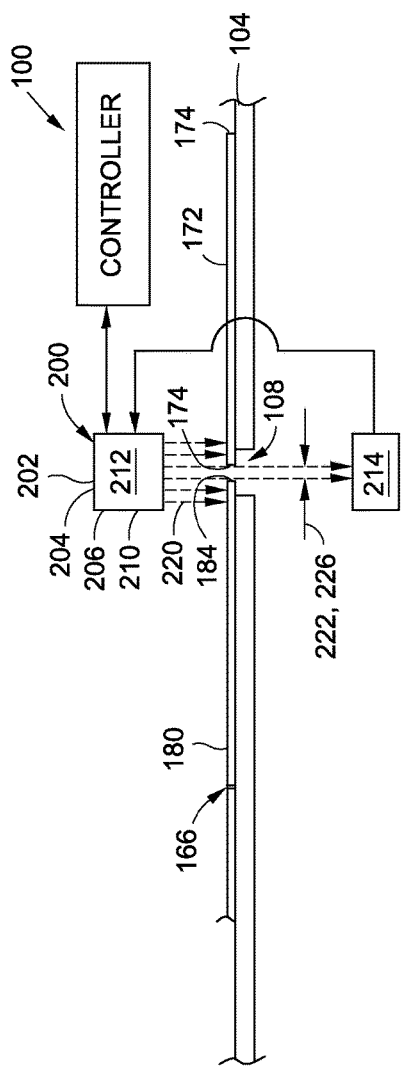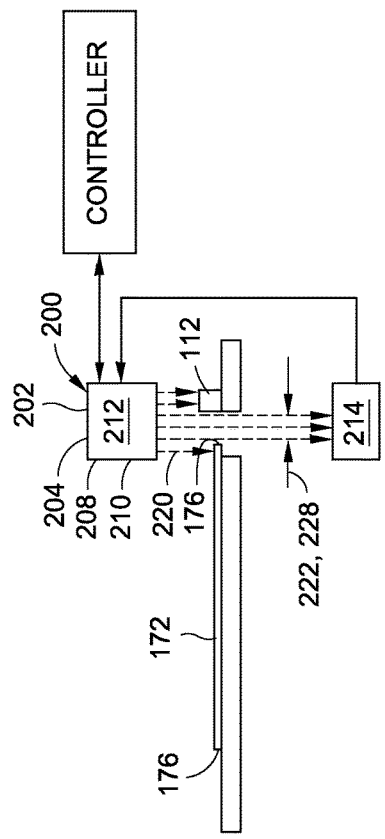

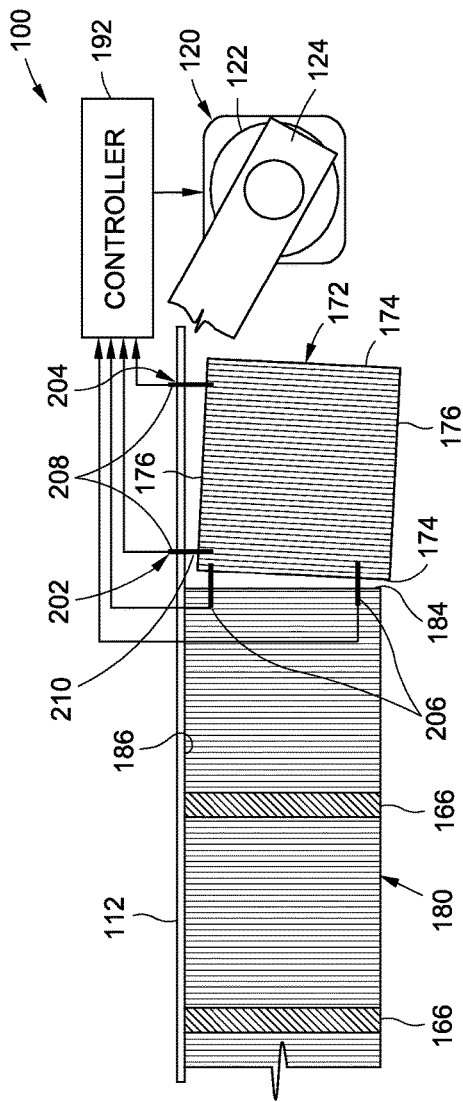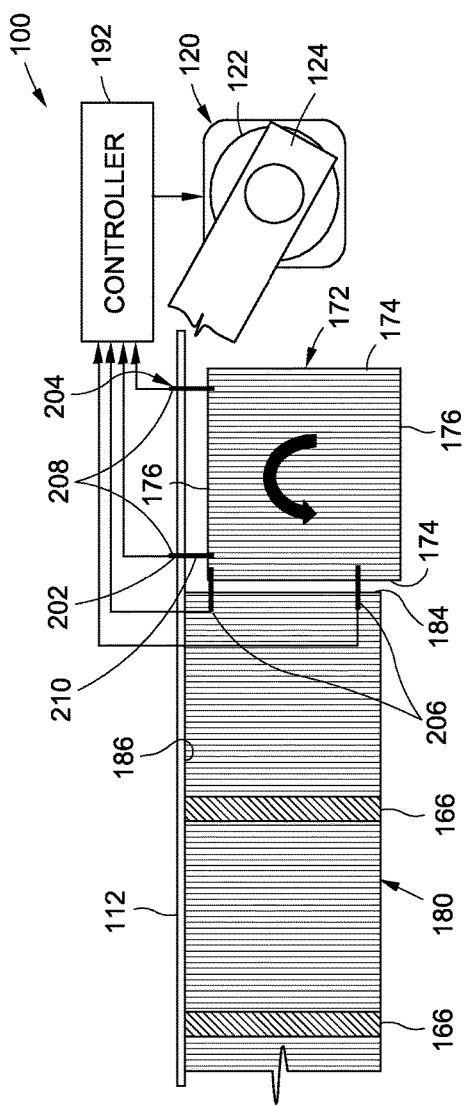

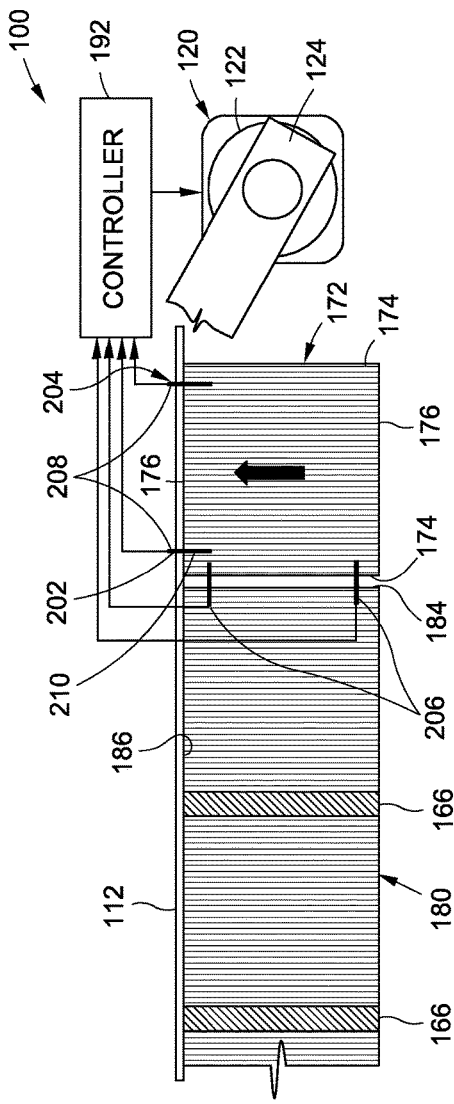
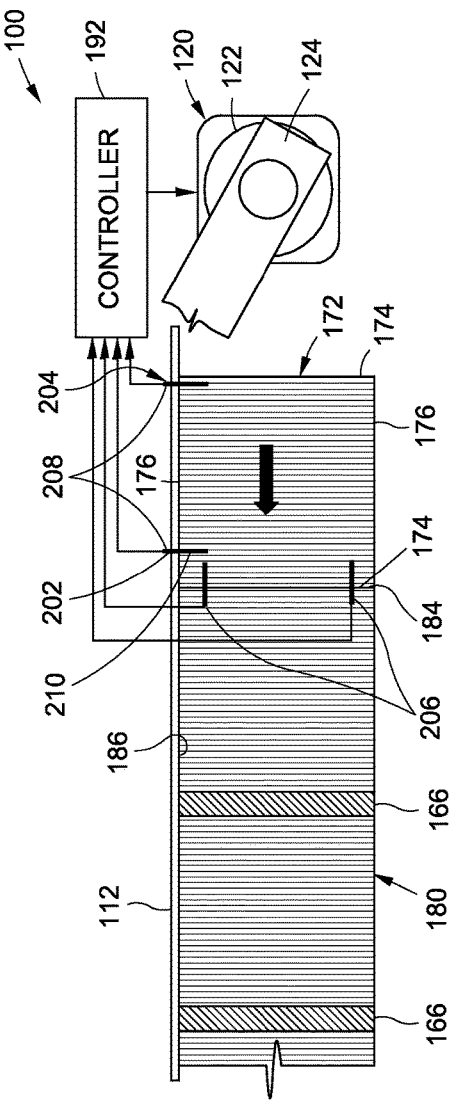
FIG. 17
FIG. 18

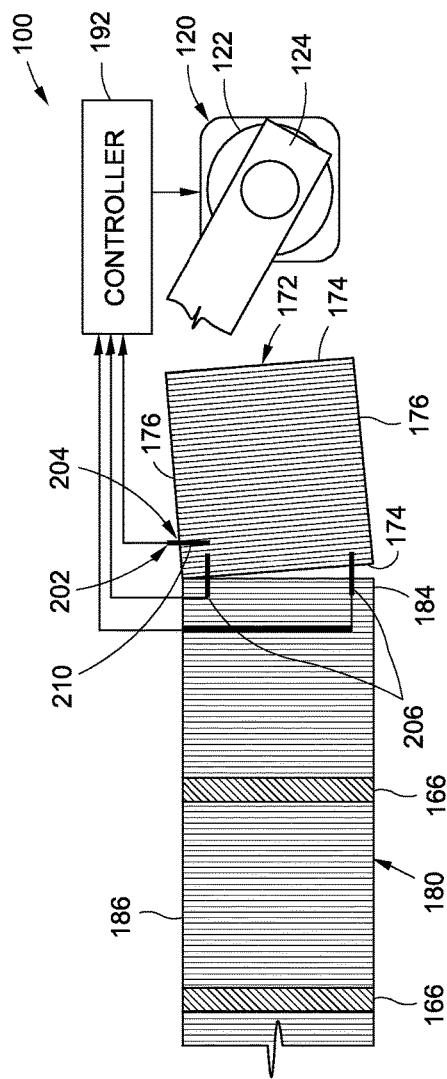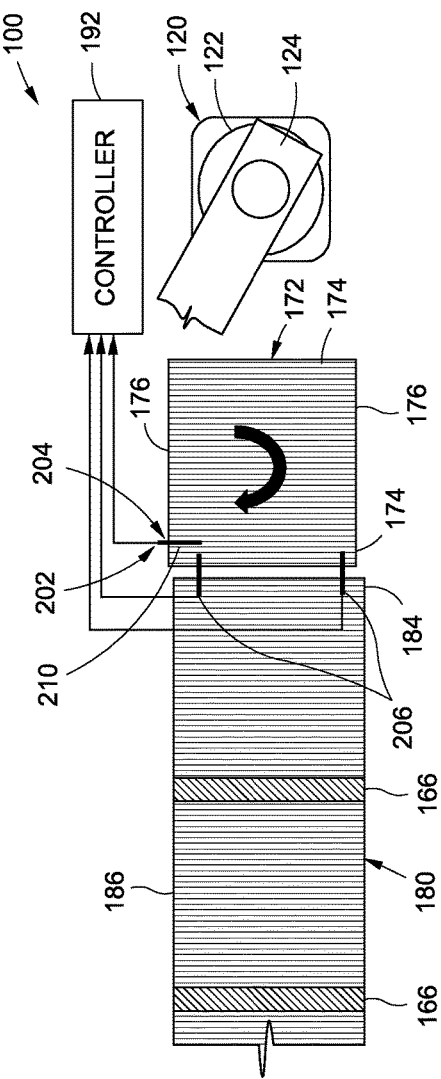

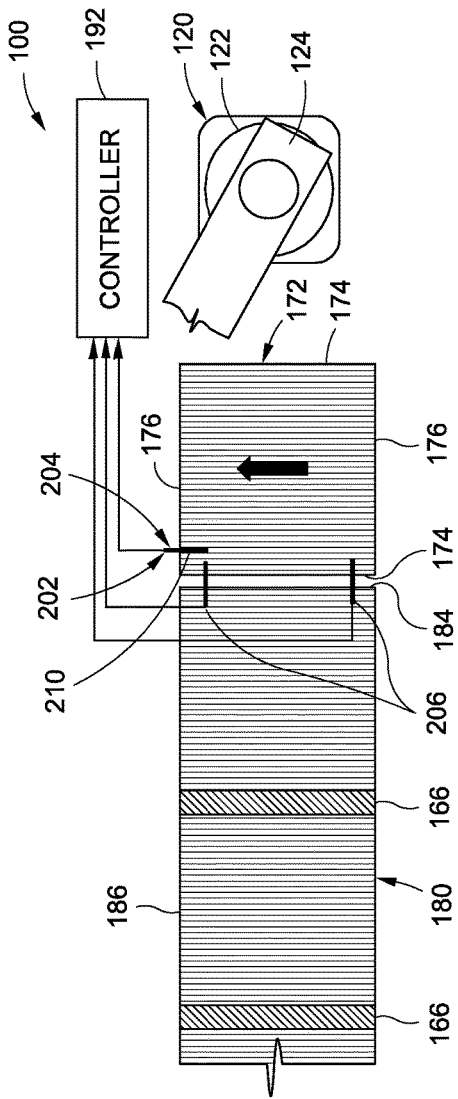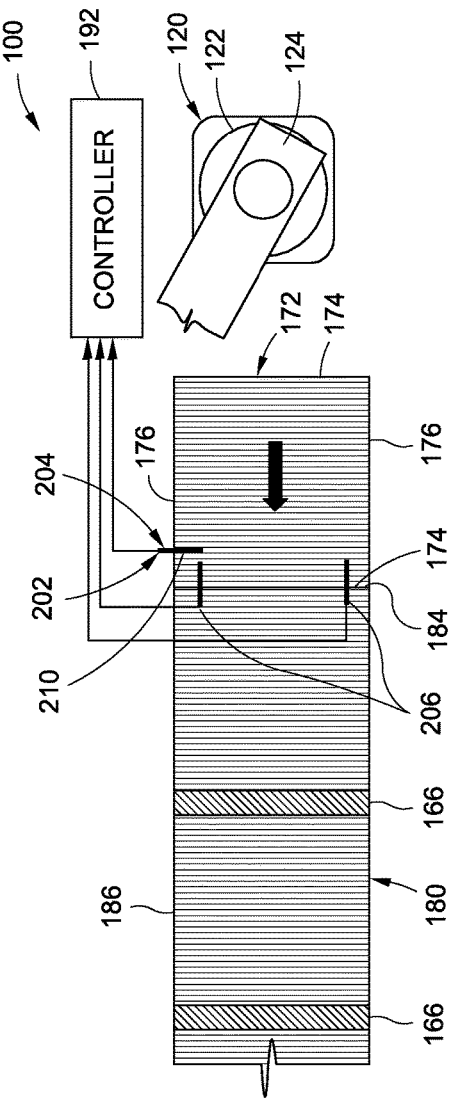

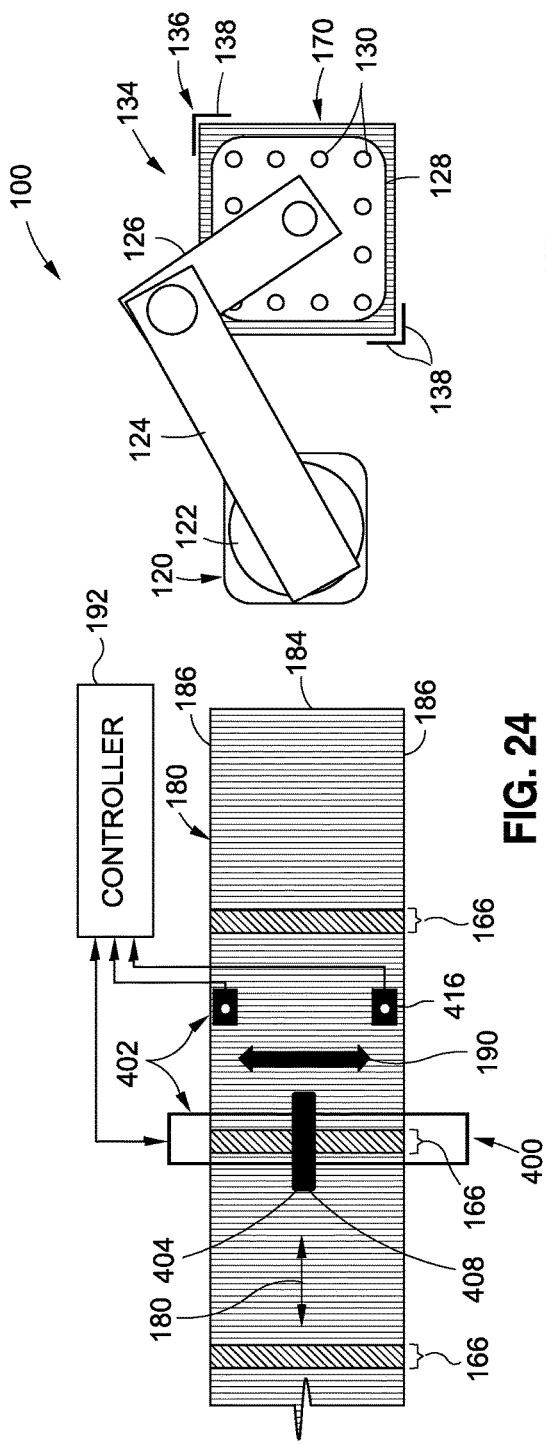
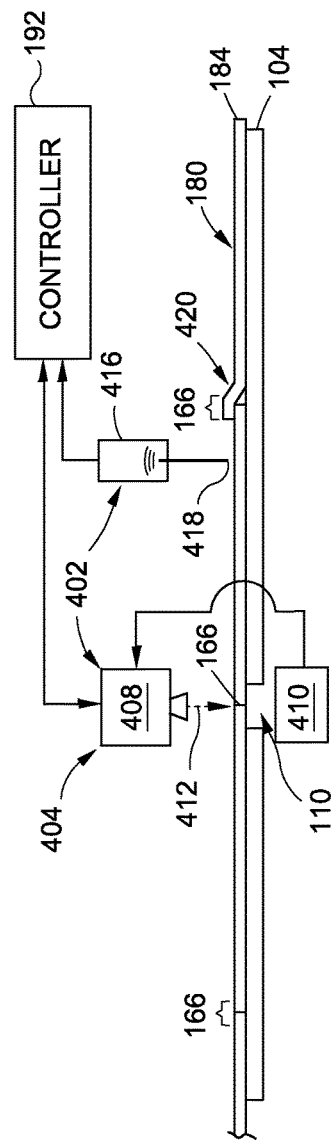
FIG. 24
FIG. 25

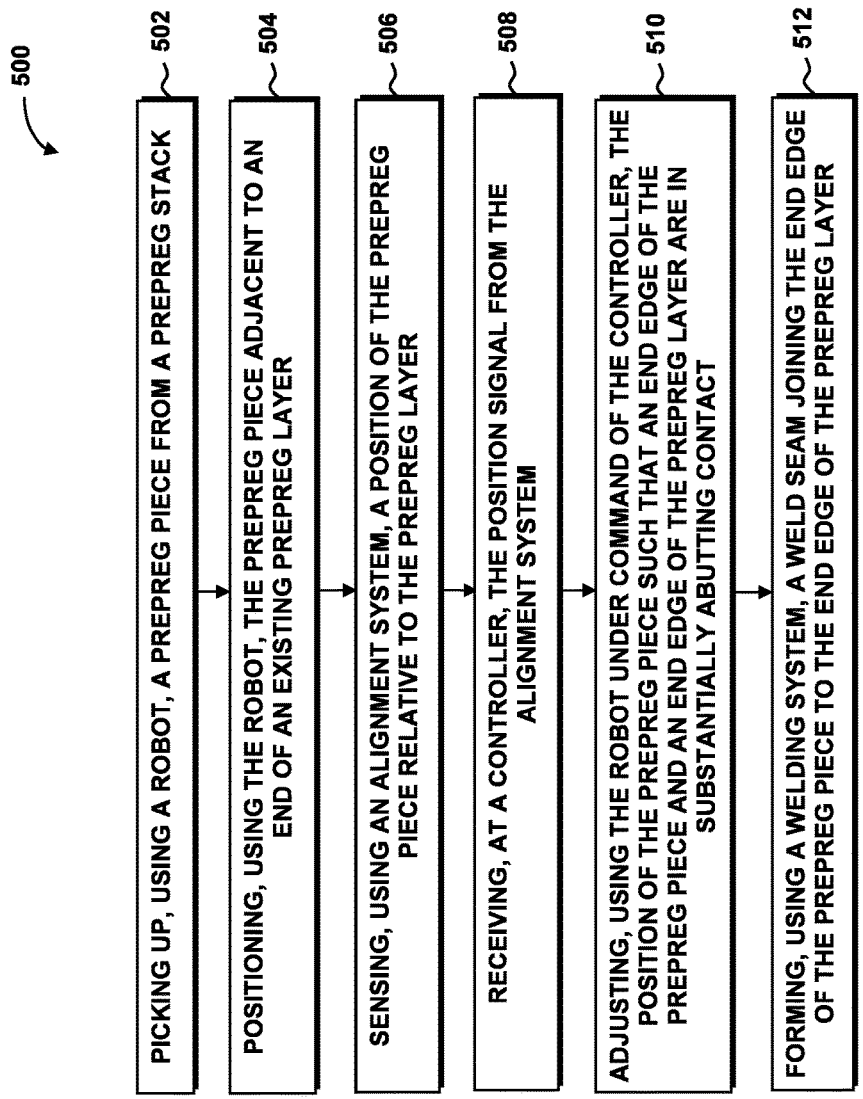

US 10,076,883 B2

SYSTEM AND METHOD FOR MANUFACTURING OFF-AXIS PREPREG MATERIAL

FIELD

The present disclosure relates generally to composite materials and, more particularly, to systems and methods for manufacturing off-axis unidirectional fiber-reinforced polymer matrix material.

BACKGROUND

The fabrication of a composite part may involve the lamination of multiple plies or layers of fiber-reinforced polymer matrix material. Each layer may be formed of unidirectional fibers. The fibers may be pre-impregnated with resin (e.g., prepreg) to simplify the manufacturing process. The fibers in each layer of a composite part may be oriented at a specific angle relative to the fiber orientation in other layers as a means to optimize the strength and stiffness properties of the composite part. Unidirectional prepreg is available in 0° material rolls wherein a majority of the fibers are oriented parallel to the lengthwise direction of the material. 0° material rolls may be available in different widths for use in automated layup equipment. For example, 0° prepreg tape may be provided in widths of up to 12 inches or more for use in an automated tape laying (ATL) machine.

For manufacturing composite parts of certain geometries, it may be desirable to lay up unidirectional prepreg tape having fibers that are oriented non-parallel or off-axis relative to the lengthwise direction of the material. The use of 0° prepreg tape to layup cross plies (e.g., 45° plies, 90° plies, etc.) of a relatively long and narrow-width composite part may require that an ATL machine traverses the part numerous times as the cross-ply is laid up along the length of the part. Unfortunately, the numerous stops and starts required of the ATL machine for laying a cross ply on a long and narrow-width part increases the amount of time required to complete the layup process.

In an attempt to reduce the amount of time required for laying up cross plies of unidirectional prepreg, rolls of off-axis unidirectional prepreg material have been manufactured. However, current methods for manufacturing off-axis unidirectional prepreg are time-consuming and require highly-skilled labor to achieve the required levels of quality in a roll of off-axis prepreg material. In addition, the output rates for manufacturing off-axis unidirectional prepreg material using conventional methods may be lower than the output rates that are required to provide a sufficient volume of material to support automated layup.

As can be seen, there exists a need in the art for a system and method for manufacturing off-axis unidirectional prepreg material at a high production rate and with a high degree of quality.

SUMMARY

The above-noted needs associated with manufacturing off-axis unidirectional prepreg material are specifically addressed and alleviated by the present disclosure which, in an embodiment, provides an off-axis prepreg material manufacturing machine. The machine may include a robot configured to position a prepreg piece adjacent to an end of a prepreg layer. The machine may additionally include an alignment system configured to sense a position of the prepreg piece relative to the prepreg layer and generate a position signal representative thereof. The machine may also include a controller configured to receive the position signal and cause the robot to adjust the position of the prepreg piece such that an end edge of the prepreg piece and an end edge of the prepreg layer are in substantially abutting contact. The machine may additionally include a welding system having one or more welding shoes configured to apply heat and pressure to the abutting end edges of the prepreg piece and prepreg layer to form a weld seam joining the prepreg piece to the prepreg layer.

Also disclosed is a method of manufacturing an off-axis thermoplastic prepreg material roll. The method may include positioning, using a robot, a prepreg piece adjacent to an end of a prepreg layer. The method may additionally include sensing, using an alignment system, a position of the prepreg piece relative to the prepreg layer and generating a position signal representative thereof. In addition, the method may include receiving at a controller the position signal from the alignment system. The method may further include adjusting, using the robot under command of the controller, the position of the prepreg piece such that an end edge of the prepreg piece and an end edge of the prepreg layer are in substantially abutting contact prior to forming a weld seam joining the prepreg piece to the prepreg layer.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 9 is a top perspective view of a 0° material roll showing prepreg cut lines oriented 45° to the lengthwise direction of the 0° material roll;

FIG. 10 is a top view of a prepreg piece cut from a 0° material roll of FIG. 9 and rotated 45°;

FIG. 11 is a top perspective view of a 45° material roll formed by welding together a plurality of prepreg pieces of FIG. 10 using the machine and method disclosed herein;

FIG. 13 is a sectional view taken along line 13-13 of FIG. 12 and illustrating an alignment system including an optical sensor emitting an optical beam for measuring a gap between the end edge of a prepreg piece and the end edge of a prepreg layer prior to welding the end edges together;

FIG. 14 is a sectional view taken along line 14-14 of FIG. 12 and illustrating an optical beam emitted by an optical sensor for measuring a gap between a side edge of the prepreg piece and an indexing feature corresponding to a side edge of the prepreg layer;

FIG. 15 is a top view of an alignment system having a first pair of optical sensors and a second pair of optical sensors for measuring the location and orientation of the prepreg piece relative to the prepreg layer;

FIG. 16 shows the rotation of the prepreg piece such that the end edge and side edge of the prepreg piece are oriented into substantially parallel relation with the respective end edge and side edge (via the indexing feature) of the prepreg layer using the robot under control of the controller and based on gap measurement data provided to the controller by the first pair and second pair of optical sensors;

FIG. 17 shows the translation of the side edge of the prepreg piece into substantially abutting contact with the indexing feature using the robot under control of the controller and based on gap measurement data provided to the controller by the second pair of optical sensors;

FIG. 18 shows the translation of the end edge of the prepreg piece into substantially abutting contact with the end edge of the prepreg layer using the robot based on gap measurement data provided to the controller by the first pair of optical sensors;

FIG. 20 is a top view of a further example of the positioning of the prepreg piece using an alignment system including a single optical sensor for measuring the position of the side edge of the prepreg piece relative to an indexing feature;

FIG. 21 shows the rotation of the prepreg piece such that the end edge if oriented parallel to the end edge of the prepreg layer using the robot based on gap measurement data provided to the controller by the second pair of optical sensors;

FIG. 22 shows the translation of the side edge of the prepreg piece into abutting contact with the indexing feature;

FIG. 23 shows the translation of the end edge of the prepreg piece into abutting contact with the end edge of the prepreg layer using the gap measurement data provided by the second pair of optical sensors;

FIG. 24 is a top view of a gap detector located at an inspection station for detecting the presence of gaps along the length of the weld seam joining the end edge of the prepreg piece to the end edge of the prepreg layer;

FIG. 25 is a sectional view of an example of a gap detector configured as a fiber optic sensor including a receiver for receiving a scanner beam emitted by the fiber optic sensor, and further illustrating an overlap sensor configured to detect the presence of an overlap in the weld seam;

FIG. 39 is a flowchart having one or more operations that may be included in a method of manufacturing a roll of off-axis unidirectional thermoplastic prepreg material.

DETAILED DESCRIPTION

Figure 1:
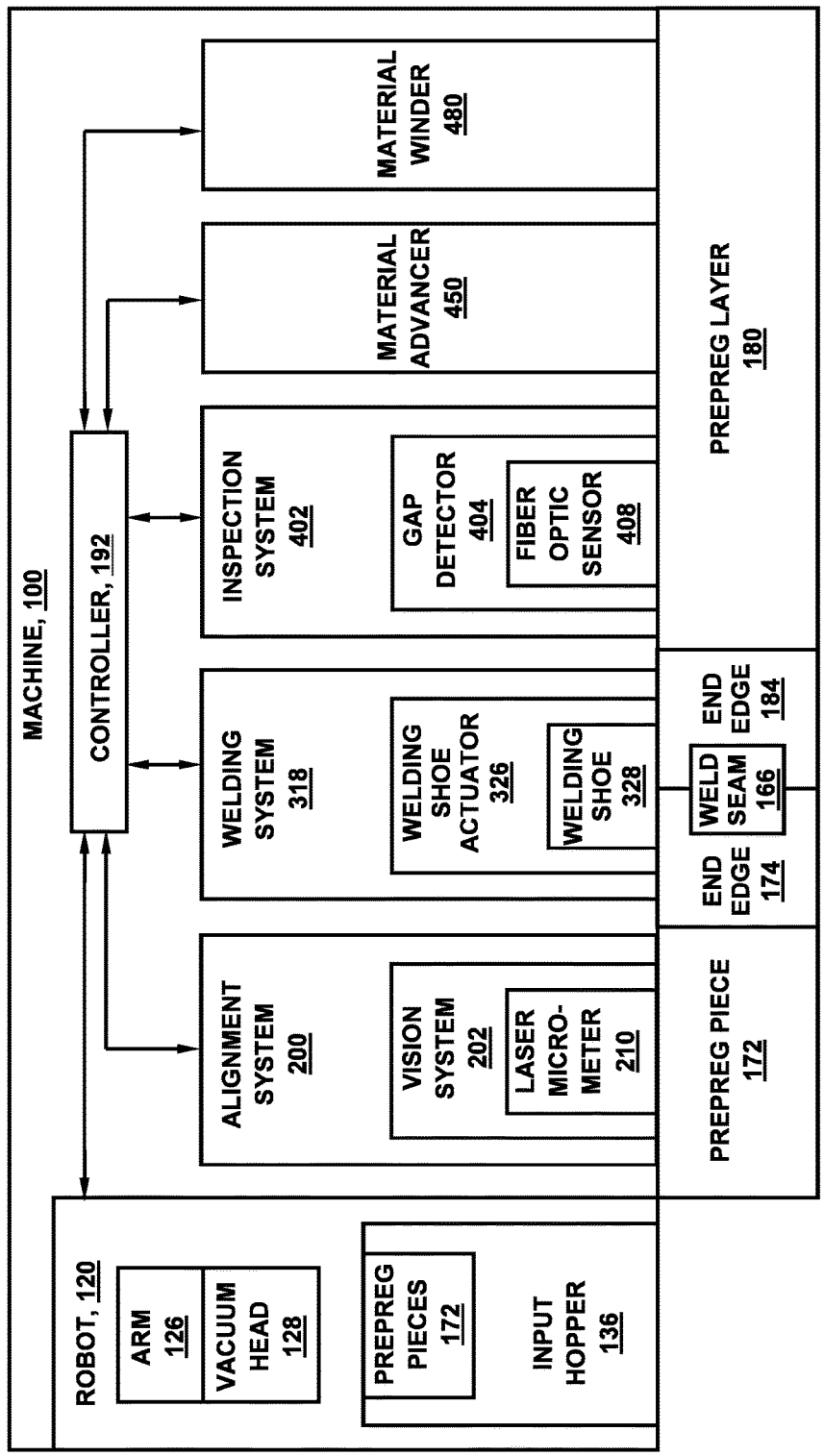
FIG. 1 is a block diagram of an example of a machine for manufacturing a roll of off-axis unidirectional thermoplastic prepreg material.
Figure 8:
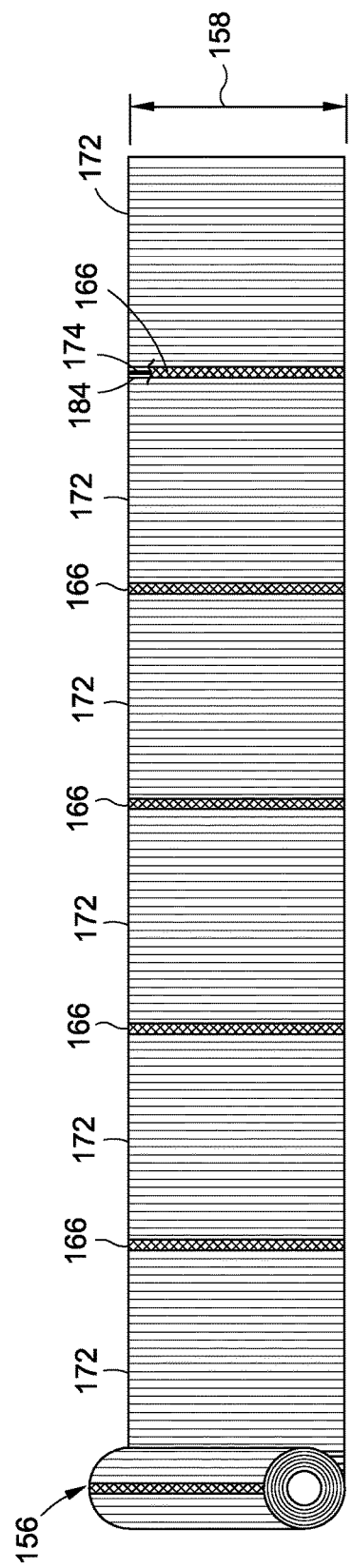
FIG. 8 is a top perspective view of a 90° material roll formed by welding together a plurality of prepreg pieces of FIG. 7 using the machine and method disclosed herein.

Referring now to the drawings wherein the showings are for purposes of illustrating various embodiments of the present disclosure, shown in FIG. 1 is a block diagram of an example of a machine 100 for manufacturing a roll of off-axis unidirectional thermoplastic prepreg material. The unidirectional thermoplastic prepreg material may include a plurality of reinforcing fibers 160 (FIG. 8) pre-impregnated with thermoplastic matrix material 162 (FIG. 8). The machine 100 may manufacture a length of off-axis unidirectional thermoplastic prepreg material by seam-welding an end-to-end series of unidirectional thermoplastic prepreg pieces 172. The prepreg pieces 172 may initially be cut from a roll of 0° unidirectional thermoplastic prepreg material (FIG. 9) having unidirectional fibers 160, a majority of which may be oriented parallel to the lengthwise direction 188 (FIG. 2) of the 0° material. The prepreg pieces 172 may be provided by a supplier in the desired size and geometry.

An off-axis material roll (e.g., see FIGS. 8 and 11) fabricated by the machine and method disclosed herein may include fibers 160 (FIG. 8) oriented non-parallel to the lengthwise direction 188 of the material. Advantageously, such off-axis material rolls may allow for the automated fabrication of thermoplastic composite components. For example, an off-axis material roll may be loaded into an automated tape laying equipment (not shown) such as an automated tape laying (ATL) machine for dispensing the off-axis material to form a composite layup with a desired ply stacking sequence. The machine and method disclosed herein advantageously performs the seam welding of thermoplastic prepreg pieces 172 at a relatively high rate and with a high level of precision and controllability of the operating parameters. The machine and method may include one or more inspection operations for inspecting the weld seams 166 to maintain a high level of quality of the final off-axis prepreg material. Although described in the context of forming a roll of material by using a material winder 480 to wind the welded prepreg layer 180 onto a core 482 (FIG. 4), the machine and method may be also implemented for forming non-rolled lengths (not shown) of off-axis unidirectional thermoplastic prepreg material.

In FIG. 1, the machine 100 may include a robot 120 which may be controlled by a controller 192 for positioning and aligning a prepreg piece 172 relative to an end 182 (FIG. 12) of an existing prepreg layer 180. At the start of a process of forming the off-axis prepreg material, the existing prepreg layer 180 may comprise a first prepreg piece 172 to which a second prepreg piece 172 may be seam-welded using the machine and method disclosed herein. The robot 120 may include one or more arms 124, 126 (FIG. 2) for positioning a prepreg piece 172 adjacent to an end edge 184 of an existing prepreg layer 180. In this regard, the controller 192 may control the robot 120 to pick up an uppermost prepreg piece 172 from a prepreg stack 170 (FIG. 4) of an input hopper 136, and position the prepreg piece 172 adjacent to an end 182 of the prepreg layer 180.

Figure 4:
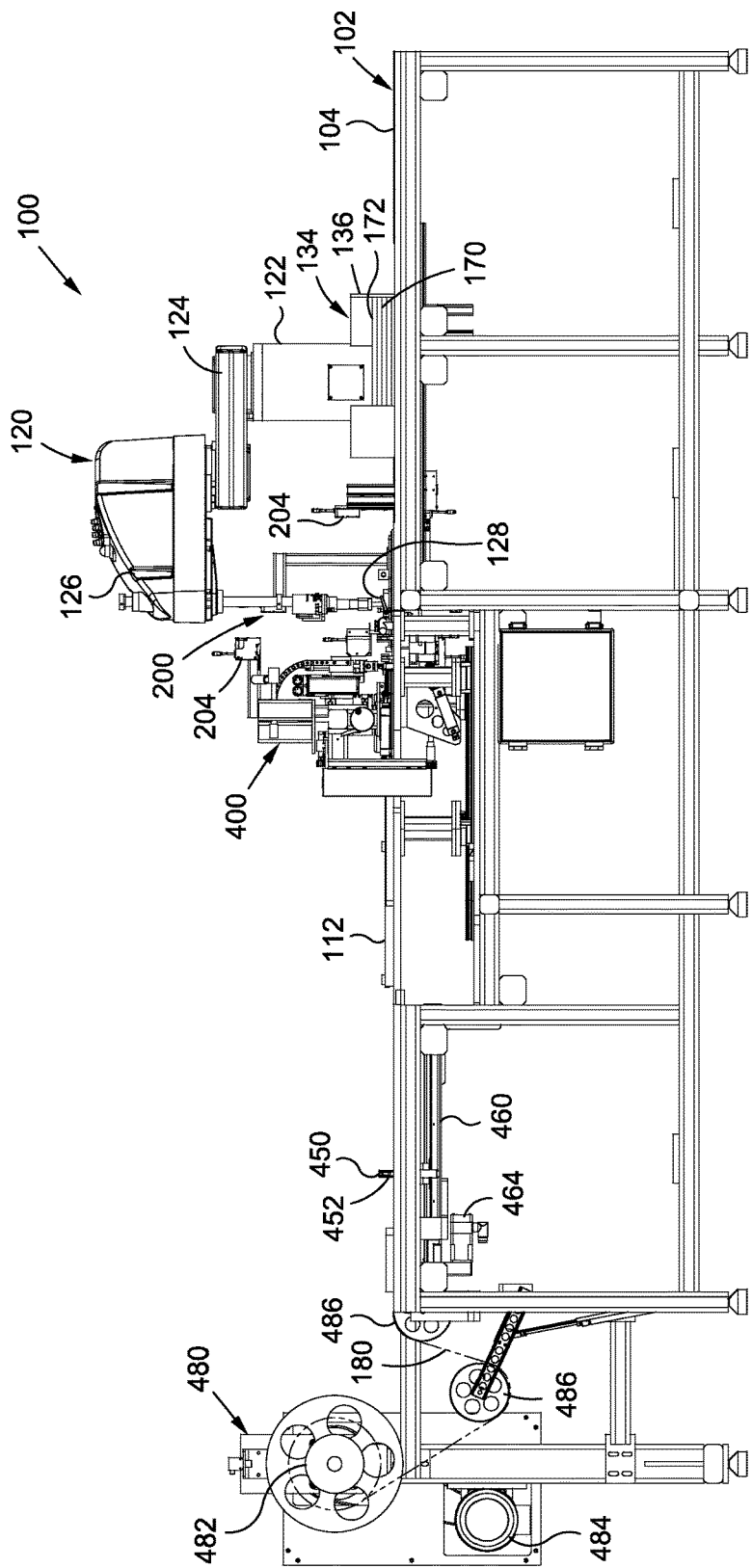
FIG. 4 is a side view of the machine of FIG. 2.

The machine 100 may include an alignment system 200 which may comprise a vision system 202 including one or more optical sensors 204 (FIG. 4). In one example, the vision system 202 may include one or more laser micrometers 210 configured for measuring the gap or distance between the end edge 174 (FIG. 12) of each new prepreg piece 172 and the end edge 184 (FIG. 12) of the existing prepreg layer 180. In some examples, the alignment system 200 may also include one or more optical sensors 204 for measuring the gap or distance between a side edge 176 (FIG. 15) of a new prepreg piece 172 and a side edge 186 (FIG. 15) of the existing prepreg layer 180 or an indexing feature 112 (FIG. 12) that represents the side edge 186 of the prepreg layer 180. Although the optical sensors 204 of the alignment system 200 are described in the context of laser micrometers 210, the optical sensors 204 may be provided in any type of configuration including still cameras and/or video cameras, fiber optic sensors, and any other type of sensor for measuring gaps between two objects.

In FIG. 1, the machine 100 may include a welding system 318 configured for forming a weld seam 166 joining the end edge 174 of each new prepreg piece 172 to an end edge 184 of an existing prepreg layer 180. The welding system 318 may include one or more welding shoes 328 configured to apply heat along the abutting end edges 174, 184 of the prepreg piece 172 and the prepreg layer 180. The welding shoes 328 may be heated such that when placed in contact with the prepreg piece 172 and prepreg layer 180 for a predetermined period of time, the solid thermoplastic matrix of the prepreg piece 172 and the prepreg layer 180 may temporarily melt or reduce in viscosity at the location where the welding shoes 328 are in contact with the prepreg piece 172 and prepreg layer 180. The melted or reduced-viscosity thermoplastic material of the abutting end edges 174, 184 may at least partially intermingle such that when the welding shoes 328 are removed from the abutting end edges 174, 184, the thermoplastic matrix may cool and re-solidify to form a weld seam 166 that may permanently bind the prepreg piece 172 to the prepreg layer 180.

The machine 100 may also include an inspection system 402 which may be located downstream of the welding system 318. The inspection system 402 may be configured to scan the newly-formed weld seams 166 to confirm the absence of through-thickness gaps along the length of the weld seam 166. The machine 100 may additionally include a material advancer 450 configured to periodically advance the prepreg layer 180 after the formation of each weld seam 166 such that the end edge 184 of the prepreg layer 180, formerly the end edge 174 of the prepreg piece 172, may be moved into alignment with the welding station 300. The machine 100 may also include a material winder 480 configured to wind the welded prepreg layer 180 onto a spool or core 482 as new prepreg pieces 172 are continuously welded to the end edge 184 of the prepreg layer 180. The prepreg layer 180 may be wound onto a core to form an off-axis material roll that may be used in a composite layup process such as by dispensing the off-axis material from an automated tape laying (ATL) machine.

Figure 2:
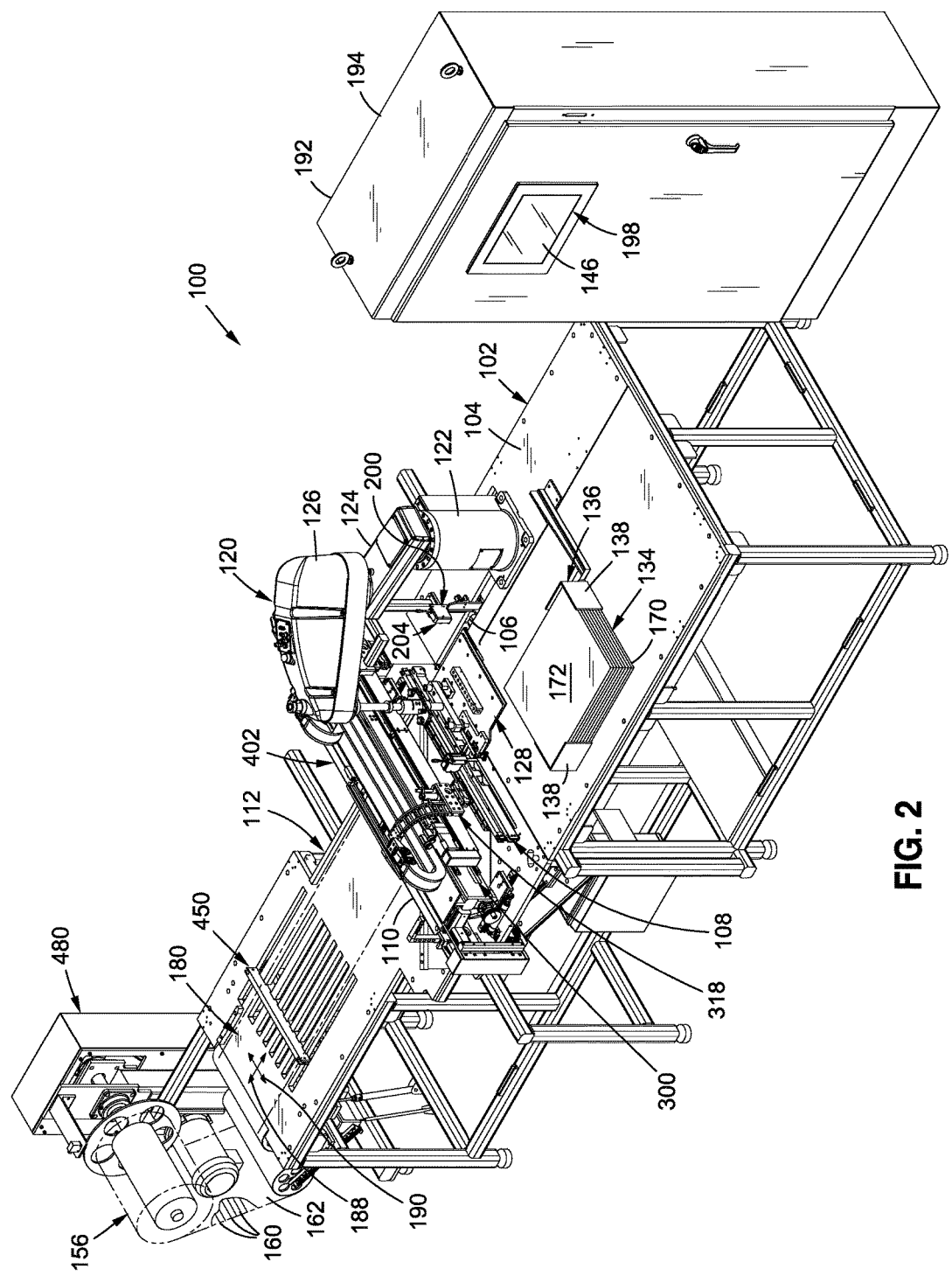
FIG. 2 is a perspective view of an example of an off-axis unidirectional prepreg material manufacturing machine.
Figure 3:
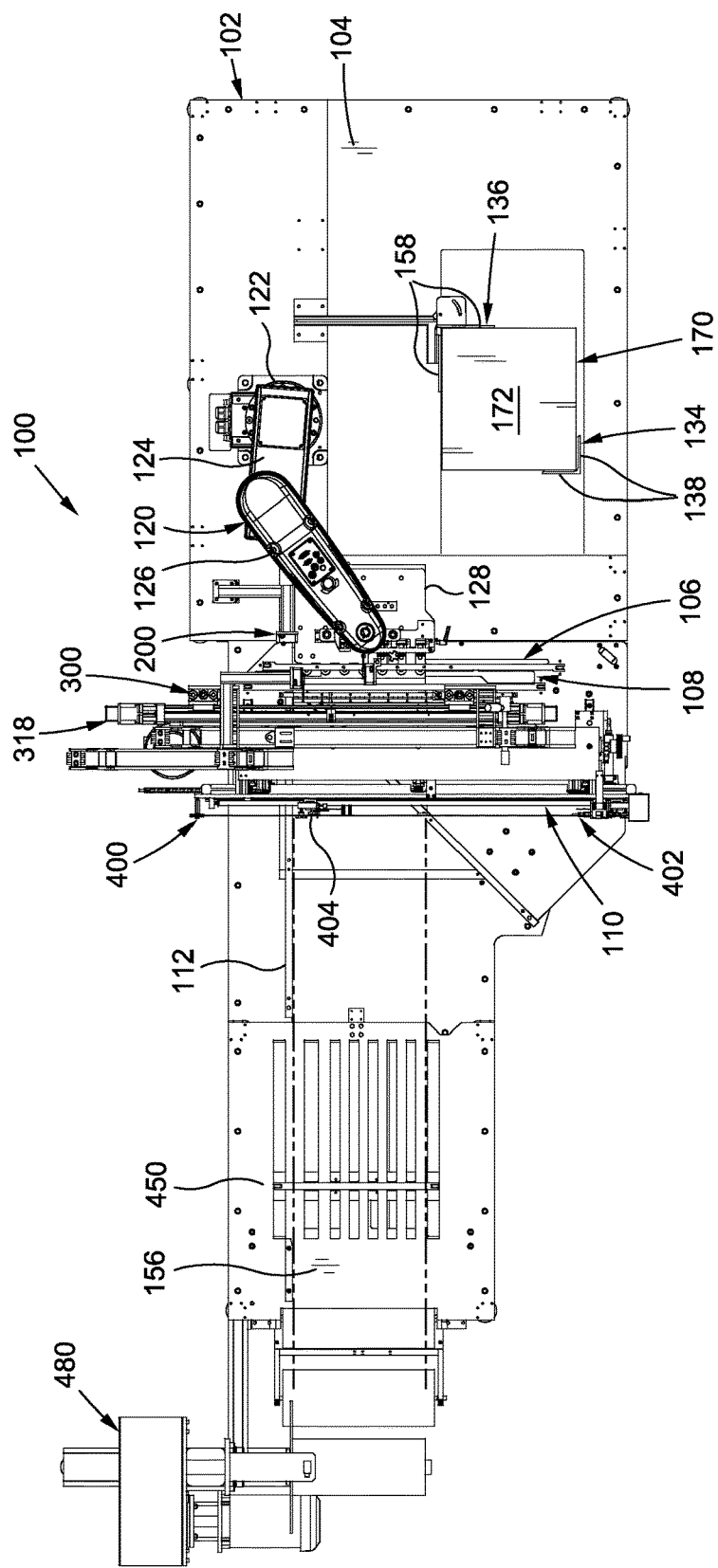
FIG. 3 is a top view of the machine of FIG. 2.

FIG. 2 is a perspective view of an example of an off-axis prepreg material roll manufacturing machine 100 showing an arrangement of the components that may be included with the machine 100. FIGS. 3 and 4 are respective top and side views of the machine 100 of FIG. 2. The robot 120 is shown having a base 122 which may be mounted to a tabletop 104 of the machine 100. The tabletop 104 may be supported on a frame which may be supported on a floor of a manufacturing facility. In an example not shown, the robot 120 may alternatively be mounted to a shop floor or to a fixture other than the tabletop 104.

Referring still to FIG. 2-4, the robot 120 may be configured as a pick-and-place apparatus having a base 122 and at least one arm 124, 126. In the example shown, the robot 120 includes a first arm 124 rotatably coupled to the base 122 and a second arm 126 rotatably coupled to the first arm 124. However, the robot 120 may be provided in any configuration, without limitation, and is not limited to the arrangement shown in the figures. The arm 126 of the robot 120 may include a vacuum head 128 configured to pick up a prepreg piece 172 from an input hopper 136, and place the prepreg piece 172 adjacent to an end 182 of an existing prepreg layer 180. The input hopper 136 may be located at a loading station 134 of the machine 100 and may be configured to support a prepreg stack 170 containing any number of prepreg pieces 172. The prepreg pieces 172 may be cut in a desired configuration from a roll of 0° unidirectional thermoplastic prepreg material, and may be manually or automatically loaded into the input hopper 136.

The input hopper 136 may include one or more guide plates 138 for containing the prepreg pieces 172. The guide plates 138 may be mounted to the tabletop 104 and may be generally vertically oriented and formed of relatively stiff metallic and/or non-metallic material. The guide plates 138 may be configured to provide a feature for indexing the side edges 176 and/or end edges 174 of the prepreg pieces 172 when stacked on top of one another in the input hopper 136. The guide plates 138 may be adjustable to accommodate any size and geometry of prepreg pieces 172.

The robot 120 may be communicatively coupled (e.g., hardwired and/or wirelessly coupled) to the controller 192. The controller 192 may be housed within a control cabinet 194. However, the controller 192 or various sub-parts of the controller 192 may be integrated into one or more of the components of the machine 100. For example, the robot 120 may include a dedicated controller 192 which may be communicatively coupled to a control system for controlling the other components (e.g., welding system 318, inspection system 402, material advancer 450, material winder 480, etc.) of the machine 100 in synchronization with control of the robot 120 by the dedicated robot 120 controller 192.

In an embodiment, the controller 192 may be a programmable logic controller 192 configured to control the robot 120. In some examples, the controller 192 that controls the robot 120 may also be configured to control other components and/or systems of the machine 100 such as the pre-weld alignment system 200, the welding system 318, the post-weld inspection system 402, the material advancer 450, and the material winder 480. The controller 192 may include an operator interface 196 configured to allow for monitoring and/or adjustment of one or more operating parameters of the components and/or systems of the machine 100. In the example shown, the operator interface 196 may be incorporated into a display screen 198 which may be configured as a touch screen. Alternatively or additionally, the operator interface 196 may include a keyboard or any number of switches, knobs, levers, dials, or other adjustment devices to allow for adjusting one or more operating parameters of the machine 100. The display screen 198 may display graphic and/or numeric representations of the operating parameters of the components and/or systems of the machine 100. For example, the display screen 198 may display the dimensions of pre-weld alignment gaps between the end edges 174, 184 of the prepreg piece 172 and prepreg layer 180, the degree of parallelism of the side edges 176 of the prepreg piece 172 relative to the prepreg layer 180, and other values representative of the position and orientation of the prepreg piece 172 relative to the prepreg layer 180 as detected and measured by the alignment system 200.

The display screen 198 may also display graphic and/or numerical representations indicating the status of one or more welding parameters (e.g., operating parameters) associated with the operation of the welding system 318 including, but not limited to, welding shoe temperature, welding shoe pressure, welding shoe dwell period, welding shoe speed, and other welding parameters such as the position and temperature of a retractable backing anvil 330 that may be extended into position directly under the prepreg piece 172 and prepreg layer 180 along the butting end edges to provide a backing surface against pressure applied onto the prepreg piece 172 and prepreg layer 180 by the welding shoes 328 during forming of a weld seam 166. The welding system 318 may be communicatively coupled to the controller 192 for controlling the operation of the welding shoes 328 and the backing anvil 330, and may further be communicatively coupled to the inspection system 402. The display screen 198 may also display one or more parameters representative of the operation of the inspection system 402 during the process of inspecting each weld seam 166. For example, the display screen 198 may generate a numerical, graphical, and/or audible alarm upon the detection by the inspection system 402 of a gap in a weld seam 166. The display screen 198 may also display information indicating the location of the gap along the weld seam 166.

Referring still to FIG. 2-4, the alignment system 200 may be located adjacent to the welding system 318. In the example shown, the alignment system 200 may be mounted to the tabletop 104 and may comprise the vision system 202 (FIG. 13) including optical sensors 204 configured to detect and measure the location and orientation of an end edge 174 and/or a side edge 176 of the prepreg piece 172 relative to an end edge 184 and/or the side edge 186 of the prepreg layer 180. The alignment system 200 may generate position signals representative of the relative positions of the prepreg piece 172 and the prepreg layer 180. The controller 192 may receive the position signals, and may calculate an aligned position of the prepreg piece 172. The controller 192 may command the robot 120 to translate and/or reorient the prepreg piece 172 into the aligned position such that the end edge 174 of the prepreg piece 172 and the end edge 184 of the prepreg layer 180 are placed into abutting contact or within at least 0.030 inch along a substantial portion of a length (e.g., along at least 50% of the length) of the abutting end edges 174, 184 prior to actuation of the welding shoes 328 (FIG. 5) to form the weld seam 166 (FIG. 5) to join the abutting end edges 174, 184. In addition, the movement of the prepreg piece 172 into the aligned position by the robot 120 may also result in a side edge 176 of the prepreg piece 172 being oriented parallel to (e.g., within 0.05°) and/or aligned with (e.g., within 0.030 inch) of a side edge 186 of the prepreg layer 180 as may be represented by an indexing feature 112 (e.g., indexing beam or fence) against which the prepreg layer side edge 186 may be abutted.

In the example shown, the welding system 318 may be supported on a movable bridge 312 which may be mounted to a pair of bridge guide tracks 314 located at opposite ends of the bridge 312. The bridge guide tracks 314 (FIG. 26) may be coupled to the tabletop 104. After alignment of a new prepreg piece 172 to the prepreg layer 180 and retraction of a deployable optical sensor 204 for measuring the gap between the end edges 174, 184 to be joined, the controller 192 may command one or more bridge drive motors 316 to translate the bridge 312 along a direction parallel to the lengthwise direction 188 of the prepreg layer 180 to place the welding shoes 328 into position over the abutting end edges 174, 184 after which the welding shoes 328 may be extended downwardly into contact with the prepreg piece 172 and prepreg layer 180 to form a weld seam 166 to join the end edges 174, 184.

The inspection system 402 may also be mounted to the movable bridge 312. As described in greater detail below, the inspection system 402 may include one or more optical sensors 204 (e.g., see FIGS. 13, 15, 26) such as a fiber optic sensor 408 for scanning the length of each weld seam 166 after advancement of the prepreg layer 180 to move a most-recently formed weld seam 166 from the welding station 300 to the inspection station 400 by the material advancer 450. The inspection system 402 optical sensors 204 may be mounted to the bridge 312 in a manner such that when the bridge 312 is in a retracted position (e.g., during alignment of a new prepreg piece 172 piece with the prepreg layer 180), the optical sensors 204 may be positioned over the most-recently formed weld seam 166 to allow the optical sensors 204 to inspect the length of the weld seam 166 for gaps, as described below.

The material advancer 450 may be located downstream of the welding system 318 and/or downstream of the inspection system 402. In the example shown, the material advancer 450 may be configured to temporarily clamp the prepreg layer 180 and pull the prepreg layer 180 along a lengthwise direction 188 of the prepreg layer 180. The material advancer 450 may include an upper advancer bar 452 (FIG. 34) and a lower advancer bar 454 (FIG. 35) configured to clamp across the width of the prepreg layer 180 after the formation of each weld seam 166. The upper and lower advancer bar 452, 454 may pull the prepreg layer 180 toward the material winder 480 such that the end edge 184 of the prepreg layer 180 is moved into position at the welding system in preparation for the alignment and welding of a new prepreg piece 172 to the end edge 184 of the prepreg layer 180.

In FIGS. 2-4, the material winder 480 may include a core that may be driven by a core drive motor 484 for periodically winding the prepreg layer 180 onto the core 482. The core drive motor 484 may be operated in synchronization with the operation of the material advancer 450. Upon command of the controller 192, the core drive motor 484 may rotate the core 482 for winding the welded prepreg layer 180 in synchronization with the advancement of the prepreg layer 180 after welding each new prepreg piece 172 to the existing prepreg layer 180. The material winder 480 may include one or more rollers 486 to facilitate winding of the prepreg layer 180 onto the core 482. For example, a roller 486 may be mounted to the end of the tabletop 104 for guiding the prepreg layer 180 downwardly toward another roller 486 configured to apply a predetermined amount of tension in the prepreg layer 180 to facilitate winding onto the core 482.

Figure 5:
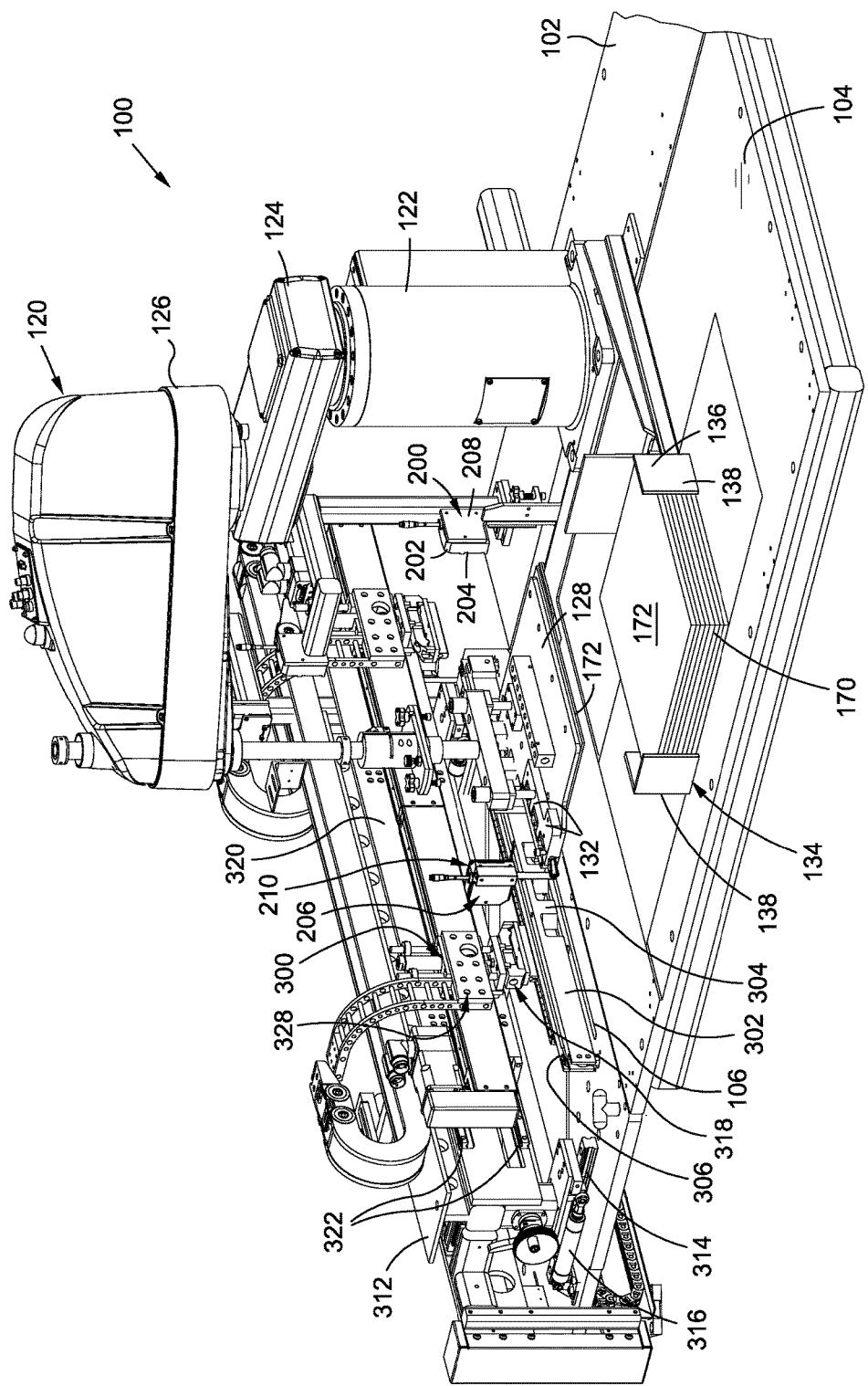
FIG. 5 is a perspective view of an example of a welding system of the machine.

FIG. 5 is a perspective view of an example of a welding system 318 and an alignment system 200 of the machine 100. As indicated above, the alignment system 200 may include one or more optical sensors 204 (FIG. 13). In the example shown, one or more of the optical sensors 204 may be mounted to one or more sensor supports 224 (e.g., see FIG. 26) which may be fixedly coupled to the table 102. The optical sensors 204 may include a transmitter 212 (FIG. 13) configured to emit an optical beam 220 downwardly onto the end edge 174, 184 and/or side edge 176, 186 of the prepreg piece 172 and the prepreg layer 180. As described below, each optical beam 220 may have a known beam width 222 (FIG. 13) and may pass through an alignment slot 106 formed in the tabletop 104. In the example shown, each transmitter 212 may be positioned above the tabletop 104 and the receiver 214 (FIG. 13) may be positioned below the tabletop 104. However, the transmitter 212 may be located underneath the tabletop 104 and the receivers 214 may be located above the tabletop 104.

In the example shown, the tabletop 104 may include an alignment slot 106 (e.g., see FIGS. 14 and 26) oriented parallel to the side edge 186 of the prepreg layer 180 to allow passage of one or more optical beams 220 emitted by the transmitter 212 of one or more optical sensors 204 for measuring the alignment of the side edge 176 of the prepreg piece 172 with the side edge 186 of the prepreg layer 180. The tabletop 104 may also include an alignment slot 106 (e.g., see FIGS. 5A, 13 and 26) oriented parallel to the end edge 184 of the prepreg layer 180 to allow passage of one or more optical beams 220 for measuring the alignment of the end edge 174 of the prepreg piece 172 with the end edge 184 of the prepreg layer 180. Each transmitter 212 of each laser micrometer 210 may include a receiver 214 mounted on a side of the tabletop 104 (e.g., mounted below the tabletop 104) opposite the transmitter 212 (e.g., mounted above the tabletop 104) and configured to receive the optical beam 220 emitted by the transmitter 212. As described in greater detail below, the beam width 222 of the optical beam 220 striking a receiver 214 may indicate the size of the gap between the end edge 174 (or side edge 176) of the prepreg piece 172 relative to the respective end edge 184 (or side edge 186) of the prepreg layer 180. The gap measurement data is provided to the controller 192 for controlling the robot 120 to adjust the position and orientation of the prepreg piece 172 until the end edge 174 of the prepreg piece 172 is substantially abutting (e.g., within 0.030 inch) the end edge 184 of the prepreg layer 180 and such that the side edge 176 of the prepreg piece 172 is aligned with (e.g., within 0.030 inch) and is parallel to the side edge 186 of the prepreg layer 180 with a predetermined tolerance (e.g., within 0.5° and, more preferably, within 0.05°).

Figure 5A:
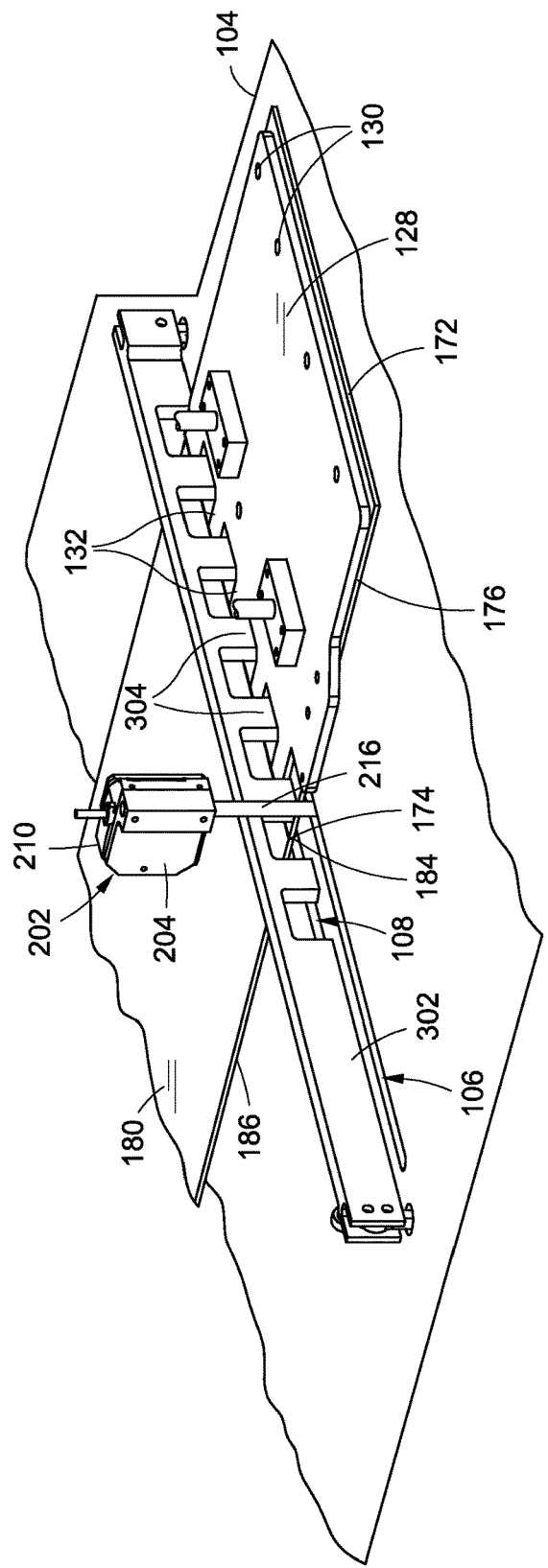
FIG. 5A is a magnified perspective view of the vacuum head and the upstream clamp bar clamping a prepreg piece in position.
Figure 26:
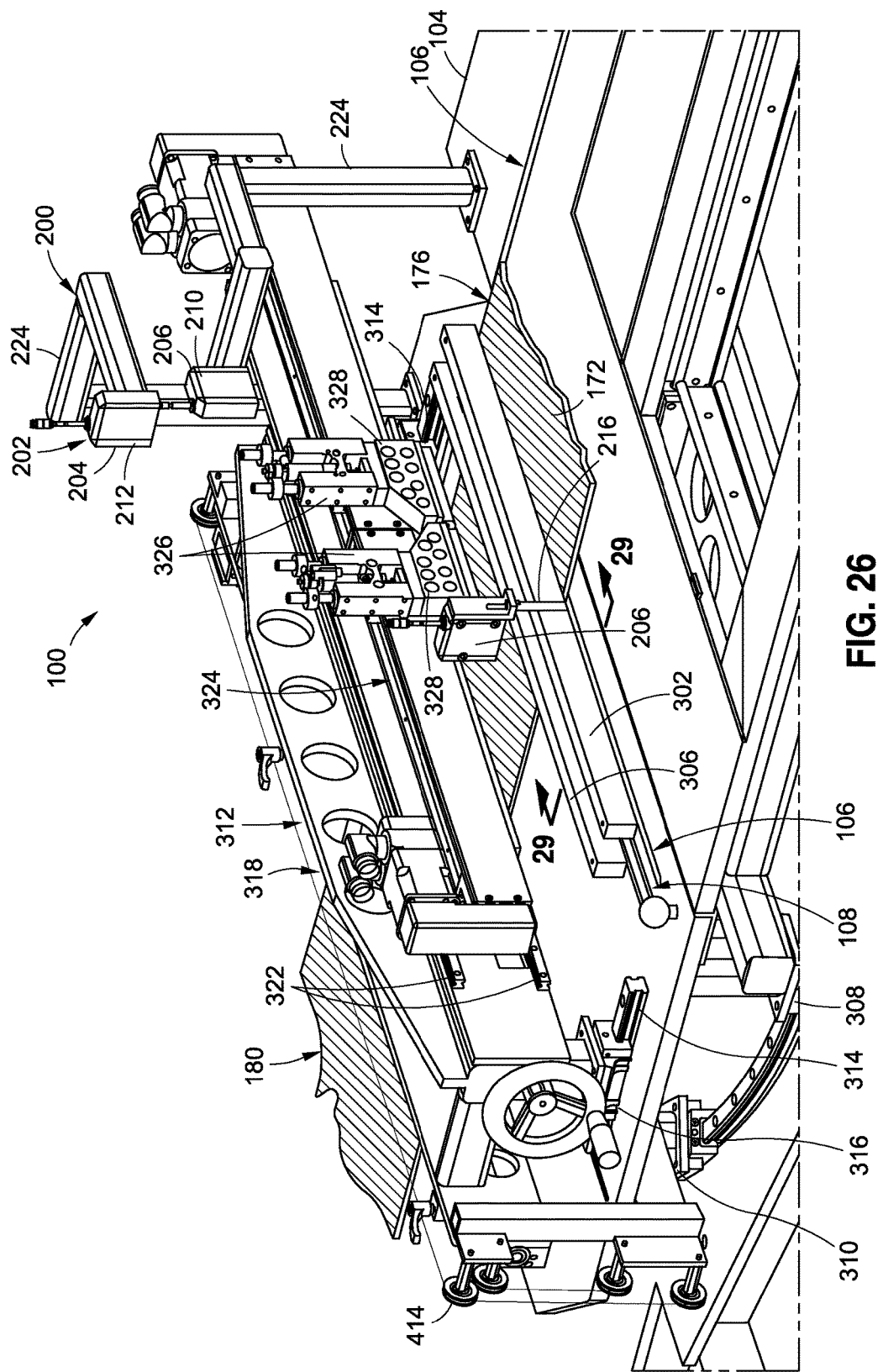
FIG. 26 is a perspective view of the welding station and illustrating a laser micrometer configured to be translatable along a welding slot formed in a tabletop and wherein the laser micrometer may be deployable to measure a gap between the end edge of the prepreg piece and the end edge of the prepreg layer during initial alignment thereof.

Also shown in FIGS. 5, 5A, and 26 are one or more mechanisms for holding the prepreg piece 172 and/or the prepreg layer 180 in position during the alignment operation and/or during the welding operation. In the example shown, a downstream clamp bar 306 may clamp the prepreg layer 180 in position against the tabletop 104 during the alignment and positioning of a new prepreg piece 172. An upstream clamp bar 302 may clamp the prepreg piece 172 in position against the tabletop 104 after the alignment of the prepreg piece 172 with the prepreg layer 180. The upstream clamp bar 302 and the downstream clamp bar 306 may continue to clamp the respective prepreg piece 172 and prepreg layer 180 to the tabletop 104 during the welding of the abutting end edges 174, 184.

FIG. 5A is a magnified view of the vacuum head 128 and the upstream clamp bar 302 clamping a prepreg piece 172 in position. Also shown is one of the laser micrometers 210 mounted on a connecting rod 216 which passes through the alignment slot 106. The laser micrometer 210 is shown rotatably deployed into position for measuring the gap between the end edge 174 (FIG. 12) of each new prepreg piece 172 and the end edge 184 (FIG. 12) of the existing prepreg layer 180, as described in greater detail below. Also shown in FIG. 5A is the upstream clamp bar 302 which may include a plurality of spaced-apart feet 304 configured to mesh with a plurality of spaced-apart fingers 132 that may be included on one or more sides of the vacuum head 128. Such an arrangement may allow the vacuum head 128 to insert the end edge 174 of the prepreg piece 172 underneath the upstream clamp bar 302 until the end edges 174, 184 of the prepreg piece 172 and prepreg layer 180 are in substantially abutting contact. The upstream clamp bar 302 may then be extended downwardly until the feet 304 of the upstream clamp bar 302 move downwardly into the gaps between the fingers 132 of the vacuum head 128 to clamp the prepreg piece 172 to the tabletop 104, after which the vacuum pressure to the vacuum head 128 may be deactivated allowing the vacuum head 128 to release the prepreg piece 172. Although not shown, the bottom surface of one or more of the feet 304 of the upstream clamp bar 302 may include protective (e.g., rubber or other viscoelastic material) pads to protect the prepreg piece 172 from indentations or mark-off.

The upstream and/or downstream clamp bar 302, 306 may be pneumatically actuated such as by using one or more air cylinders (not shown) which may be controlled by the controller 192. The air cylinders may be located underneath the tabletop 104 and may be positioned on opposite ends of each one of the clamp bars 302, 306. The machine 100 may include a pneumatic system (not shown) which may include a pressurized air tank or accumulator. The pneumatic system may be configured to provide air pressure for operating one or more pneumatic actuators such as for actuating the welding shoes 328, the clamp bars 302, 306, the material advancer 450, and other components, and/or for providing vacuum pressure to the vacuum head 128 of the robot 120 for picking up prepreg pieces 172. In an alternative to clamp bars 302, 306, the prepreg layer 180 and/or the prepreg piece 172 may be secured in position on the tabletop 104 using vacuum pressure. For example, the tabletop 104 may include a plurality of vacuum holes (not shown) for suctioning the prepreg layer 180 and/or prepreg piece 172 to the tabletop 104 during the alignment operation, the welding operation, and/or the inspection operation.

Figure 7:
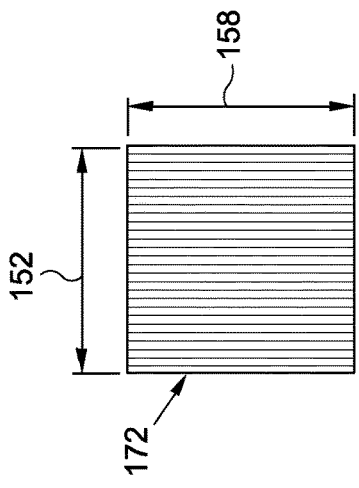
FIG. 7 is a top view of a prepreg piece cut from the 0° material roll of FIG. 6 and rotated 90°.
Figure 6:
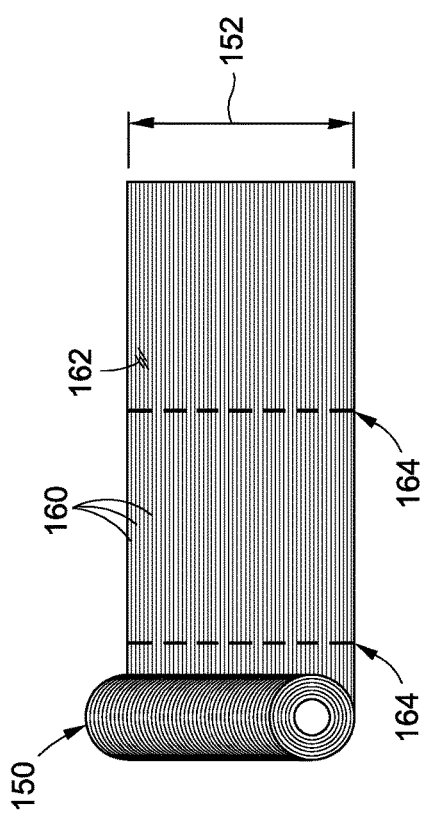
FIG. 6 is a top perspective view of a 0° material roll and illustrating prepreg cut lines oriented 90° relative to the lengthwise direction of the 0° material roll.

FIG. 6 is a top perspective view of a 0° material roll 150 from which prepreg pieces 172 may be cut in a separate process such as by a supplier along the prepreg cut lines 164 to form individual prepreg pieces 172 (FIG. 7). In FIG. 6, the prepreg cut lines 164 are oriented 90° relative to the lengthwise direction 188 of the 0° material roll 150. As indicated above, 0° unidirectional thermoplastic prepreg includes unidirectional fibers pre-impregnated with thermoplastic matrix material. A majority of the fibers 160 are oriented parallel to the lengthwise direction 188 of the 0° material. The fibers 160 may be formed of any one of the following materials: aramids, polyolefins, metal, glass, carbon, boron, ceramic, mineral, and any one of a variety of other materials or combination of materials. The thermoplastic matrix 162 may be provided in at least one of the following material compositions: acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions. The 0° material roll 150 and therefore the prepreg pieces 172 may be provided in any thickness such as from 0.0025-0.0175 inch or more.

FIG. 7 illustrates a prepreg piece 172 that may be cut by a supplier from a 0° material roll 150 along the prepreg cut lines 164 of FIG. 6 and rotated 90°. The 0° material roll 150 may be provided in a 0° roll width 152. The distance between the prepreg cut lines 164 determines the off-axis roll width 158 of each prepreg piece 172. The prepreg pieces 172 may be provided by a supplier in the desired 0° roll width 152, off-axis roll width 158, and geometry (e.g., rectangular, square, trapezoidal), and in the desired material system of the fibers 160 and matrix 162. A plurality of prepreg pieces 172 may be manually or automatically loaded into the input hopper 136 of the machine 100 (FIG. 2-4).

FIG. 8 is a top perspective view of an example 90° material roll 156. The 90° material roll 156 may be formed using the machine 100 and method disclosed herein by welding together in end-to-end relation a series of prepreg pieces 172 configured as shown in FIG. 7. The 90° material roll 156 has an off-axis roll width 158 which is determined by the distance between the prepreg cut lines 164 on the 0° material roll 150.

FIG. 9 is a top perspective view of a 0° material roll 150 having prepreg cut lines 164 which are oriented 45° relative to the lengthwise direction 188 of the 0° material roll 150.

FIG. 10 illustrates a prepreg piece 172 that may be cut by a material supplier from a 0° material roll 150 along the prepreg cut lines 164 of FIG. 9, and which is shown in FIG. 10 rotated 45°. The prepreg piece 172 has an off-axis roll width 158 which is defined by the normal distance between the prepreg cut lines 164. As indicated above, the prepreg pieces 172 may be provided by a material supplier in an offline process. The 0° material roll 150 may be provided in an incoming 0° roll widths 152 of 3-24 inches or more and in thicknesses of 0.0025 to 0.0175 inch or more.

FIG. 11 is a top perspective view of an example of a 45° material roll 154 that may be formed using the machine 100 and method disclosed herein by welding together in end-to-end relation a series of the prepreg pieces 172 of FIG. 10. The off-axis roll width 158 may be in the range of from 2-40 inches or more. As described in greater detail below, the machine 100 may include a material winder 480 configured to wind the prepreg layer 180 onto a core to achieve a final material roll diameter of from 3-12 inches or more.

As may be appreciated, off-axis material rolls having fiber angles other than 45° and 90° (e.g., 15°, 22.5°, 30°, 60°, 75°, etc.) may also be formed using the system and method disclosed herein by loading prepreg pieces 172 of the appropriate geometry and fiber orientation into the input hopper 136 of the machine 100 and adjusting the orientation of the welding system 318 to correspond to the fiber angle of the prepreg pieces 172. In this regard, the machine 100 may include the capability for pivoting the welding system into the desired orientation in an optional embodiment shown in FIGS. 36-38 and described below.

Figure 12:
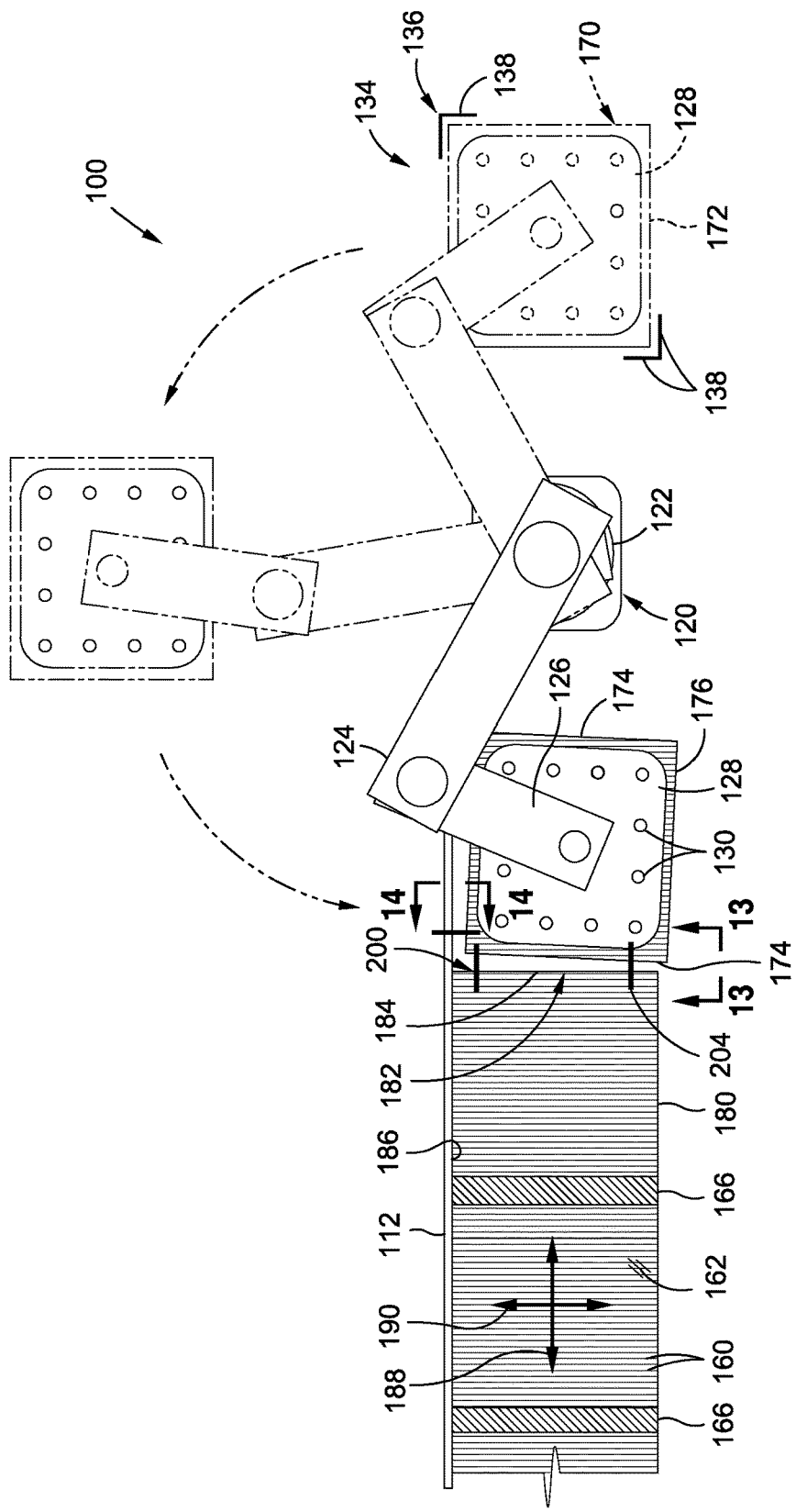
FIG. 12 is a schematic view of a robot positioning a prepreg piece adjacent to an end of a prepreg layer.

FIG. 12 is a schematic view of an example of a robot 120 arm positioning a prepreg piece 172 adjacent to an end 182 of a prepreg layer 180. The controller 192 may initially command the robot 120 to position the vacuum head 128 above the prepreg stack 170 contained in an input hopper 136 and then lower the vacuum head 128 into contact with the top prepreg piece 172 of the prepreg stack 170. The vacuum head 128 may include a vacuum plate configured to provide a relatively stiff surface that may be resistant to flexing for accuracy in placement of the prepreg piece 172. The vacuum plate may have a non-stick coating and may include an array of vacuum holes, vacuum ports 130, or vacuum cups that may be fluidly coupled to a vacuum source (e.g., a vacuum pump—not shown). In some examples, the vacuum head 128 may include a vacuum manifold (not shown) that may allow for selection of certain ones of the vacuum ports 130 to receive vacuum pressure in correspondence with the size of the prepreg piece 172 to be handled by the vacuum head 128.

When vacuum pressure is applied to the vacuum head 128, suction force may lift and retain a prepreg piece 172 against the vacuum plate. When the vacuum pressure is removed, the vacuum head 128 may release the prepreg piece 172 such as after the prepreg piece 172 is positioned relative to the prepreg layer 180 and clamped to the tabletop 104 prior to initiating the welding operation. The vacuum head 128 may be sized and configured complementary to the size and shape of the prepreg pieces 172 in the input hopper 136. The vacuum head 128 may include a quick-change fitting (not shown) to facilitate rapid manual or automated (e.g., by command of the controller) change-out of a vacuum head 128 of one size and/or shape for a vacuum head 128 of another size and/or shape. Although the present disclosure describes the use of vacuum to pick and place the prepreg piece 172, any one of a variety of other techniques may be implemented for pick and place of the prepreg pieces 172 into position relative to the prepreg layer 180. For example, although not shown, the robot 120 may include a head configured to mechanically engage (e.g., pick up and release) the prepreg piece 172 without the use of vacuum pressure.

FIG. 12 also illustrates a plurality of optical sensors 204 of the alignment system 200. The optical sensor 204 may detect or sense the location and/or orientation of a new prepreg piece 172 relative to an existing prepreg layer 180, and may generate a position signal representative of the relative location and/or orientation of the prepreg piece 172. The position signal may be transmitted to the controller 192 on a periodic basis or on a continuous basis (e.g., in real time). In this regard, the controller 192 may use feedback (e.g., continuous position signals) from the optical sensors 204 to position the end edge 174 and/or side edge 176 of the prepreg piece 172 within a predetermined tolerance of the end edge 184 and/or side edge 186 of the prepreg layer 180. As described in greater detail below, the controller 192 may command the robot 120 to move the end edges 174, 184 of the prepreg piece 172 and prepreg layer 180 into substantially abutting contact (e.g., within 0.030 inch) at one or more locations along the abutting end edges 174, 184 and without creating an overlap 420 between the end edges 174, 184.

The side edge 186 of the prepreg layer 180 may be positioned into substantially abutting contact with an indexing feature 112 such as an indexing beam or fence that may be affixed to the tabletop 104 of the machine 100. The indexing feature 112 may extend past the end edge 184 of the prepreg layer 180 and may provide a surface against which the side edge 186 of the prepreg piece 172 may be aligned and positioned into substantially abutting contact based on gap measurement data provided by one or more optical sensors 204 of the alignment system 200. By aligning the side edge 176 of the prepreg piece 172 with the indexing feature 112, the side edges of the prepreg piece 172 and prepreg layer 180 may be aligned and straight which may advantageously result in flat sides for the finished material roll when wound on a core 482 (e.g., FIGS. 8 and 11).

FIG. 13 is a sectional view of an optical sensor 204 configured as a laser micrometer 210 as may be included in the alignment system 200 for measuring the gap 226 between the end edge 174 of the prepreg piece 172 and the end edge 184 of the prepreg layer 180. The alignment system 200 may include a pair of optical sensors 204 (e.g., a second pair 208 of laser micrometers 210, see FIG. 15) for measuring the gap 226 between the end edge 174, 184 of the prepreg piece 172 and prepreg layer 180. A first pair 206 of laser micrometers 210 may measure the gap 228 between the side edges 176, 186 of the prepreg piece 172 and prepreg layer 180 as described below.

In FIG. 13, one laser micrometer 210 may be positioned adjacent to the side edge 186 of the prepreg layer 180 near the indexing feature 112. Another laser micrometer 210 may be positioned near the opposite side edge 186 of the prepreg layer 180. The pair of laser micrometers 210 may measure the gap 226 between the end edges 174, 184 of the prepreg piece 172 and the prepreg layer 180. The gap measurements from the laser micrometers 210 may be provided to the controller 192 which may calculate the amount of translation required by the robot 120 to position the end edge 174 of the prepreg piece 172 into substantially abutting contact (e.g., within 0.05 inch) with the end edge 184 of the prepreg layer 180. In addition, the gap measurements from the pair of laser micrometers 210 may be used by the controller 192 to calculate the amount of rotation required by the robot 120 to orient the end edge 174 of the prepreg piece 172 into parallel alignment (e.g., to within 0.5° and, more preferably, to within) 0.05°) of the end edge 184 of the prepreg layer 180.

As shown in FIG. 13, each laser micrometer 210 may include a transmitter 212 for emitting an optical beam 220 that may be received by a receiver 214 positioned opposite the transmitter. The transmitter 212 may be positioned above the tabletop 104 at a location such that the optical beam 220 overlaps the side edge 186 of the prepreg layer 180. When the robot 120 moves the prepreg piece 172 sufficiently close to the end edge 184 of the prepreg layer 180 (e.g., within 1 inch and, more preferably, within 0.25 inch), the optical beam 220 may also strike the end edge 174 of the prepreg piece 172. The portion of the optical beam 220 that is not blocked by the end edges 174, 184 of the prepreg piece 172 and prepreg layer 180 may pass through the alignment slot 106 and strike the receiver 214 located underneath the tabletop 104. The beam width 222 of the optical beam 220 striking the receiver 214 may represent the size of the gap between the end edge 184 of the prepreg layer 180 and the end edge 174 of the prepreg piece 172. The laser micrometer 210 may transmit to the controller 192 a position signal representative of the gap measurement. The controller 192 may calculate an aligned position of the prepreg piece 172 relative to the prepreg layer 180 based on the gap measurement, and may command the robot 120 to move (e.g., translate and/or rotate) the prepreg piece 172 into the aligned position such that an end edge 174 of the prepreg piece 172 and an end edge 184 of the prepreg layer 180 are in substantially abutting contact along a substantial portion of a length of the end edges 174, 184.

FIG. 14 is a sectional view of a laser micrometer 210 as may be included in the alignment system 200 for measuring the gap 228 between a side edge 176 of the prepreg piece 172 and an indexing feature 112 corresponding to a side edge 186 of the prepreg layer 180. As indicated above, the indexing feature 112 may comprise an indexing beam or fence affixed to the tabletop 104. Alternatively, the indexing feature 112 may comprise a marking (not shown) (e.g., an etch mark or a graphic marking on the tabletop 104) which may be detectable by the optical sensors 204. The side edge 186 of the prepreg layer 180 may be positioned into substantially abutting contact or alignment with the indexing feature 112. The alignment system 200 may include a second pair 208 of optical sensors 204 such as a second pair 208 of laser micrometers 210 (e.g., see FIGS. 5 and 15) for measuring the gap 228 between the side edge 176 of the prepreg piece 172 and the indexing feature 112. Each laser micrometer 210 may emit an optical beam 220 which may be partially blocked by the indexing feature 112 and the side edge 176 of the prepreg piece 172. A remaining portion of the optical beam 220 may pass through the alignment slot 106 and strike the receiver 214 to generate a gap measurement. The gap measurement from the second pair 208 of laser micrometers 210 may be provided to the controller 192 which may calculate the amount of translation and rotation required to position the side edge 176 of the prepreg piece 172 into substantially abutting contact with the indexing feature 112 and such that the side edge 176 of the prepreg piece 172 is parallel to the side edge 186 of the indexing feature 112 to within a predetermined angular tolerance (e.g., approximately) 0.05°).

FIG. 15 is a top view of an alignment system 200 having a first pair 206 of optical sensors 204 and a second pair 208 of optical sensors 204 (e.g., laser micrometers 210) for measuring the location and orientation of the prepreg piece 172 relative to the prepreg layer 180. The robot 120 may be programmed to initially position each prepreg piece 172 such that the end edge 174 and side of the prepreg piece 172 are within a predetermined distance of the respective end edge 184 and side edge 186 of the prepreg layer 180 and within a predetermined degree of parallelism. The closeness with which the robot 120 initially positions the prepreg piece 172 relative to the prepreg layer 180 may be dependent upon the nominal beam width 222 of the optical beam 220 emitted by the laser micrometers 210. For example, for a nominal beam width 222 of approximately 1 inch, the robot 120 may be preprogrammed to initially position the prepreg piece 172 such that the end edge 174 and side edge 176 of the prepreg piece 172 are within 0.5 inch of the respective end edge 184 and side edge 186 (via the indexing feature 112) of the prepreg layer 180. A wider beam width 222 of the optical beam 220 (e.g., 2 inches) may allow for a larger tolerance (e.g., within 1 inch) for the initial positioning of the prepreg piece 172 relative to the prepreg layer 180.

FIG. 16 shows the rotation of the prepreg piece 172 by the robot 120 under command of the controller 192. Based on the gap measurement data provided by the first and second pair 206, 208 of laser micrometers 210, the controller 192 may calculate a correction angle and a direction of rotation for the robot 120 to orient the prepreg piece 172 such that the side edge 176 of the prepreg piece 172 is parallel to the side edge 186 (via the indexing feature 112) of the prepreg layer 180 within a predetermined tolerance. For example, the end edge 174 and side edge 176 of the prepreg piece 172 may be oriented to within approximately 0.05° of the respective end edge 184 and side edge 186 of the prepreg layer 180. The controller 192 may be configured to generate an alert or alarm to notify an operator in the event that the angular tolerance (e.g., 0.05°) is exceeded. The alarm may be an audible alarm or a visual alarm as may be displayed on a display screen 198 of the control cabinet 194.

FIG. 17 shows the translation of the prepreg piece 172 by the robot 120 to position the side edge 176 of the prepreg piece 172 into substantially abutting contact with the indexing feature 112. The controller 192 may command the operation of the robot 120 based on gap measurement data in the position signal provided to the controller 192 by the first pair 206 of laser micrometers 210. In some examples, the laser micrometers 210 may include amplifiers to provide real time feedback to the controller 192 regarding the current gap measurement as the robot 120 translates the prepreg piece 172 the calculated gap distance for the side edge 176 to contact the indexing feature 112.

FIG. 18 shows the translation of the prepreg piece 172 by the robot 120 to position the end edge 174 of the prepreg piece 172 into substantially abutting contact with the end edge of the prepreg layer 180. The robot 120 may translate the prepreg piece 172 based on gap measurement data provided to the controller 192 by the first pair 206 of optical sensors 204. In any one of the examples disclosed herein, the optical sensors 204 for positioning the prepreg piece 172 may provide real-time (e.g., continuous) gap measurement data to the controller 192 to allow the controller 192 to dynamically adjust the movement of the robot 120 based on the real-time gap measurement data. In addition, the end edge 174 and/or side edge 176 of a prepreg piece 172 may be positioned within a predetermined tolerance (e.g., within 0.030 inch) of the respective end edge 184 and/or side edge 186 of the prepreg layer 180, and may not necessarily be placed in substantially abutting contact with the respective end edge 184 and/or side edge 186 of the prepreg layer 180. In some examples, the controller 192 may be configured to generate an alarm to notify an operator in the event that the gap tolerance (e.g., 0.030 inch) is exceeded.

The accuracy with which the prepreg piece 172 may be positioned may be dependent at least in part upon the resolution of the laser micrometers 210 and the resolution of movement of the robot 120 and which are preferably matched to one another. For example, the laser micrometers 210 may be limited to measuring gaps no smaller than 0.005 inch and the robot 120 may be limited to positioning the prepreg piece 172 to within 0.005 inch of a position calculated by the controller 192. With such tolerances, the end edge 174 and/or side edge 176 of the prepreg piece 172 may be positioned within 0.005 inch of the respective end edge 184 and/or side edge 186 of the prepreg layer 180. As may be appreciated, a smaller resolution of the laser micrometers 210 and robot 120 may allow for more accurate positioning of the prepreg piece 172 relative to the prepreg layer 180 with a potential impact on production rate of the off-axis prepreg.

Figure 19:
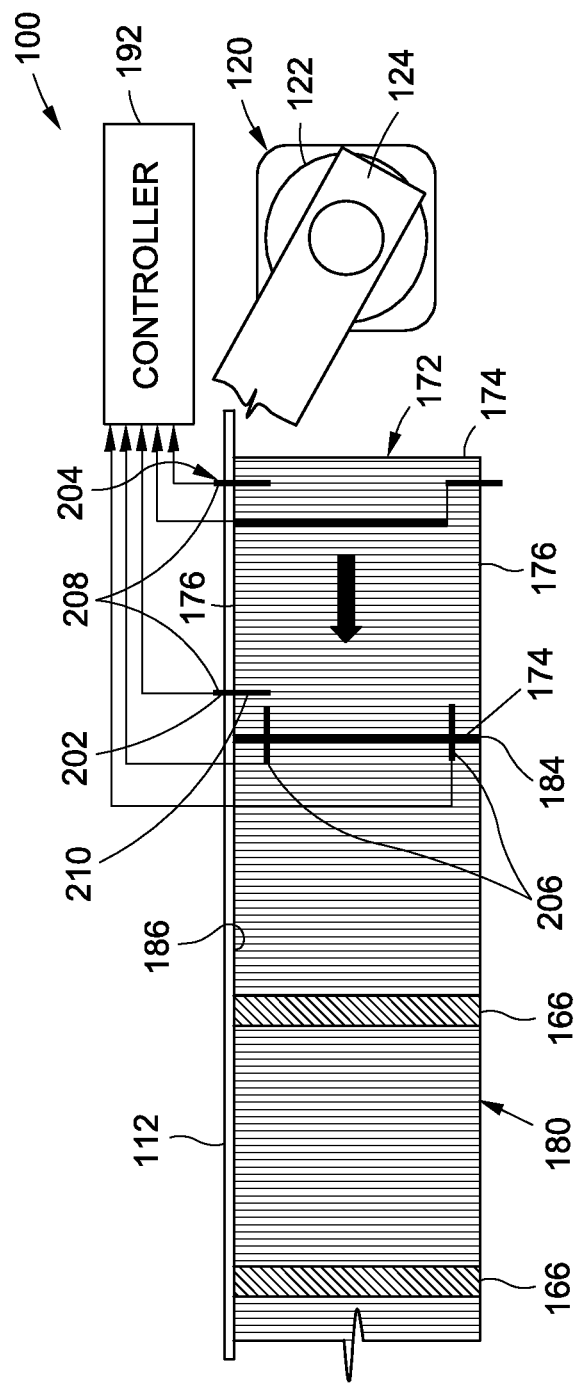
FIG. 19 is a top view of a further example of an alignment system including a first and second pair of optical sensors and further including an additional optical sensor for measuring the length of the prepreg piece.

FIG. 19 is a top view of a further example of an alignment system 200 including a first and second pair 206, 208 of optical sensors 204 and an additional optical sensor 204 to enable the measurement of the off-axis roll width 158 (e.g., see FIG. 7) of the prepreg piece 172. The additional optical sensor 204 may be configured as a laser micrometer 210 having a transmitter 212 that may emit an optical beam 220 downwardly onto a side edge 176 opposite the side edge 176 measured by the second pair 208 of laser micrometers 210. The optical beam 220 may pass through an additional alignment slot 106 (not shown) formed in the tabletop 104 and may strike a receiver 214 which may then generate a length measurement based on a known distance of the additional laser micrometer 210 from the laser micrometer 210 on an opposite side edge 176. The controller 192 may be configured to generate an alarm to notify an operator in the event that the off-axis roll width 158 of the prepreg piece 172 exceeds the off-axis roll width 158 of the existing prepreg layer 180 by a predetermined amount (e.g., by more than 0.050 inch).

FIG. 20 is a top view of a further example of the an alignment system 200 including a single optical sensor 204 for measuring the position of the side edge 176 of the prepreg piece 172 relative to an indexing feature 112, and a first pair 206 of optical sensors 204 for gap measurement between the end edges 174, 184 of the prepreg piece 172 and prepreg layer 180. The robot 120 may be preprogrammed to pick up the prepreg piece 172 from the top of a prepreg stack 170 at the input hopper 136 and pre-position the prepreg piece 172 at the free end of the prepreg layer 180. The optical sensors 204 in FIG. 20 may be configured as laser micrometers 210 or other type of optical sensor 204 capable of generating gap measurements and transmitting position signals to the controller 192.

FIG. 21 shows the rotation by the robot 120 of the prepreg piece 172 such that the end edge 174 of the prepreg piece 172 is oriented parallel to the end edge 184 of the prepreg layer 180. The rotation angle and the direction of rotation may be calculated by the controller 192 based on gap measurement data provided to the controller 192 by the first pair 206 of optical sensors 204.

FIG. 22 shows the translation by the robot 120 of the prepreg piece 172 toward the indexing feature 112 such that the side edge 176 of the prepreg piece 172 is move into substantially abutting contact with the indexing feature 112. As indicated above, the indexing feature 112 represents the side edge 186 of the prepreg layer 180 which may be butted up against the indexing feature 112. The optical sensor 204 may provide continuous feedback of the gap measurements to the controller 192 to allow the controller 192 to adjust the movement of the robot 120 as the side nears the indexing feature 112.

FIG. 23 shows the translation by the robot 120 of the prepreg piece 172 toward the prepreg layer 180 such that the end edge 174 of the prepreg piece 172 is moved into substantially abutting contact with the end edge 184 of the prepreg layer 180. The translation of the robot 120 may be calculated by the controller 192 using the gap measurement data provided in the position signal transmitted to the controller 192 by the first pair 206 of optical sensors 204. In one example, the robot 120 may be configured to position the end edge 174 of the prepreg piece 172 to within approximately 0.030 inch of the end edge 184 of the prepreg layer 180 although the prepreg piece 172 may be positioned such that the end edges 174, 184 of the prepreg piece 172 and prepreg layer 180 are spaced apart at gaps larger than 0.030 inch.

FIG. 24 is a top view of a gap detector 404 as may be located at an inspection station 400 of the machine 100. After the formation of each weld seam 166, the prepreg layer 180 may be advanced along the tabletop 104 to position the most-recently formed weld seam 166 over an inspection slot 110 (FIG. 25) that may be formed in the tabletop 104. The inspection slot 110 may be oriented transverse to the lengthwise direction 188 of the prepreg layer 180 or parallel to the orientation of the weld seam 166.

FIG. 25 is a sectional view of an example of a gap detector 404 configured as a fiber optic sensor 408 including a scanner receiver 410 for receiving a scanner beam 412 emitted by the fiber optic sensor 408. The gap detector 404 may be positioned above the tabletop 104 and over the weld seam 166. The scanner receiver 410 may be located below the tabletop 104 and positioned directly underneath the fiber optic sensor 408. The fiber optic sensor 408 and the scanner receiver 410 may be translated in unison along the length of each newly-created weld seam 166 as the fiber optic sensor 408 continuously emits a scanner beam 412 downwardly onto the weld seam 166. The scanner beam 412 may be directed along the location wherein the end edges 174, 184 of the prepreg piece 172 and prepreg layer 180 abut one another. In some examples, the scanner beam 412 may have a width of less than 1 inch. However, the fiber optic sensor 408 may be configured to emit a scanner beam 412 of any width, without limitation.

A through-thickness gap (not shown) may be detected in the weld seam 166 at any location where the scanner beam 412 passes through the weld seam 166 and inspection slot 110 and impinges on the scanner receiver 410. The scanner receiver 410 may register the impingement of the scanner beam 412 and generate a signal which may be transmitted to the controller 192 to generate an alarm for alerting an operator. The alarm may be audible and/or visual such as a warning light. Upon receiving the alarm, the operator may stop the off-axis prepreg material manufacturing process to allow the through-thickness gap to be manually inspected. In some examples, the signal may include information indicating the location of the through-thickness gap along the weld seam 166. The gap detector 404 may be configured to scan the most recently formed weld seam 166 while a new prepreg piece 172 is being aligned with the prepreg layer 180.

FIG. 25 additionally illustrates at least one overlap sensor 416 that may be included with the inspection system 402 for detecting the presence of an overlap 420 in a recently-formed weld seam 166. In the example shown, one or more overlap sensors 416 may be located between the welding station 300 and inspection station 400. However, the overlap sensors 416 may be positioned at any location along the length of the prepreg layer 180 including downstream from the inspection station 400. The overlap sensor 416 may measure the thickness of the prepreg layer 180 as the prepreg layer 180 is advanced along the tabletop 104 to position the recently-formed weld seam 166 into alignment with the gap detector 404. In one example, the overlap sensor 416 may configured as a high-accuracy digital contact sensor having the capability for measuring changes in thickness of down to 2 microns (e.g., approximately 0.0001 inch). In some examples, the machine 100 may include an overlap sensor 416 adjacent to each side edge 186 of the prepreg layer 180. Each overlap sensor 416 may be positioned up to several inches inboard from the side edge 186 of the prepreg layer 180. However, any number of overlap sensors 416 may be positioned at any location along the width of the prepreg layer 180.

An overlap sensor 416 may each include a tip 418 that may be positioned just above the top surface of the prepreg layer 180. The tip 418 may be positioned in contacting relation with the top surface of the prepreg layer 180 or within 0.001 inch above the top surface of the prepreg layer 180. If an overlap 420 exists in a weld seam 166, the localized thickness increase in the prepreg layer 180 (e.g., due to the overlap 420) may contact the tip 418 as the prepreg layer 180 is advanced along the tabletop 104 by the material advancer 450. The localized thickness increase may trigger the overlap sensor 416 to transmit a signal to the controller 192 for generating an alarm to alert the machine operator. The signal may optionally include information indicating the location of the overlap 420 along the weld seam 166 and which may be displayed on a display screen 198. Upon receiving the alarm, the operator may stop the machine 100 to allow the overlap 420 to be manually inspected.

Figure 27:
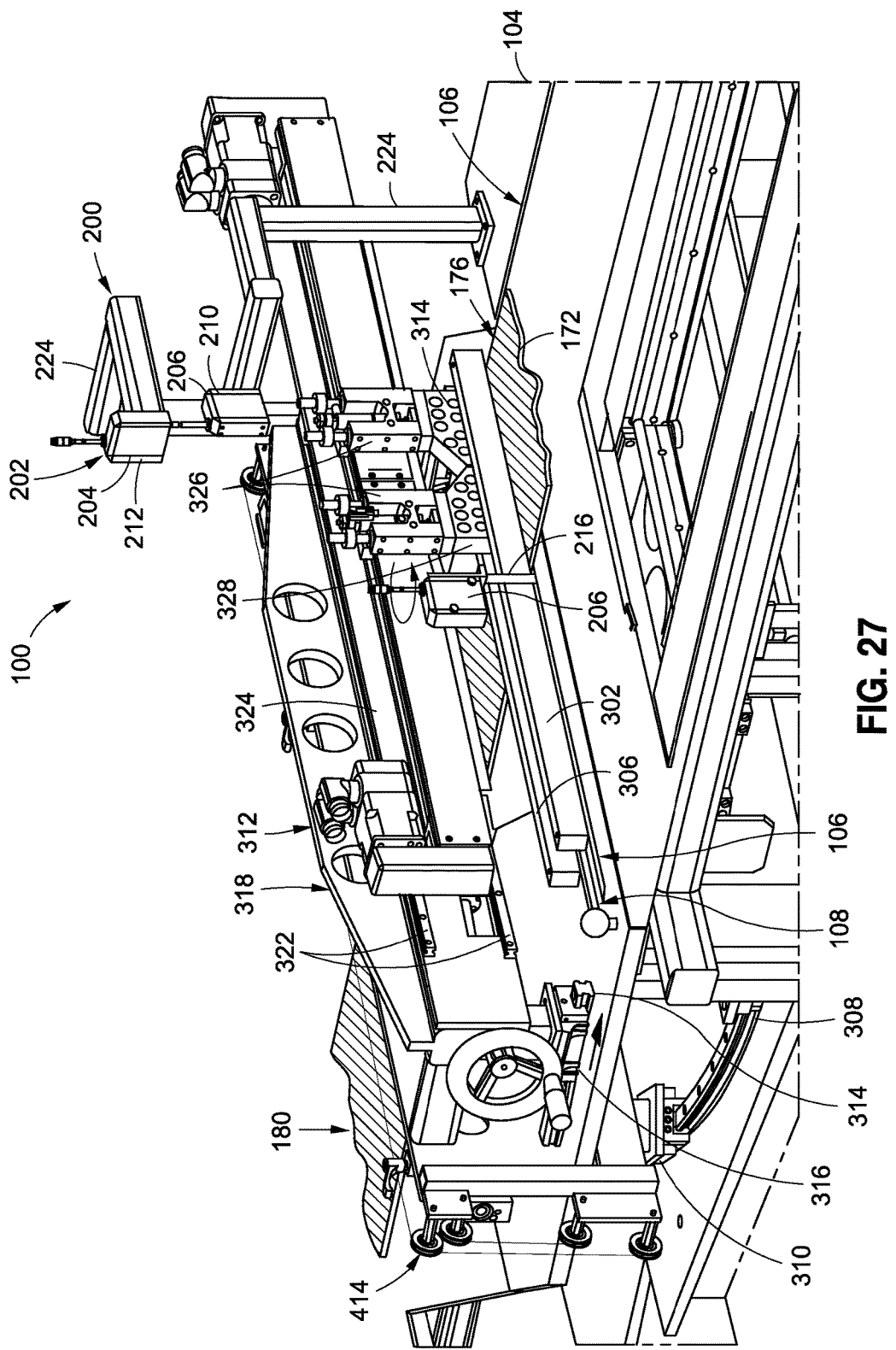
FIG. 27 is a perspective view of the welding station after alignment of the prepreg piece and showing retraction of the laser micrometer and downward extension of a pair of welding shoes in between an upstream clamp bar and a downstream clamp bar.
Figure 28:
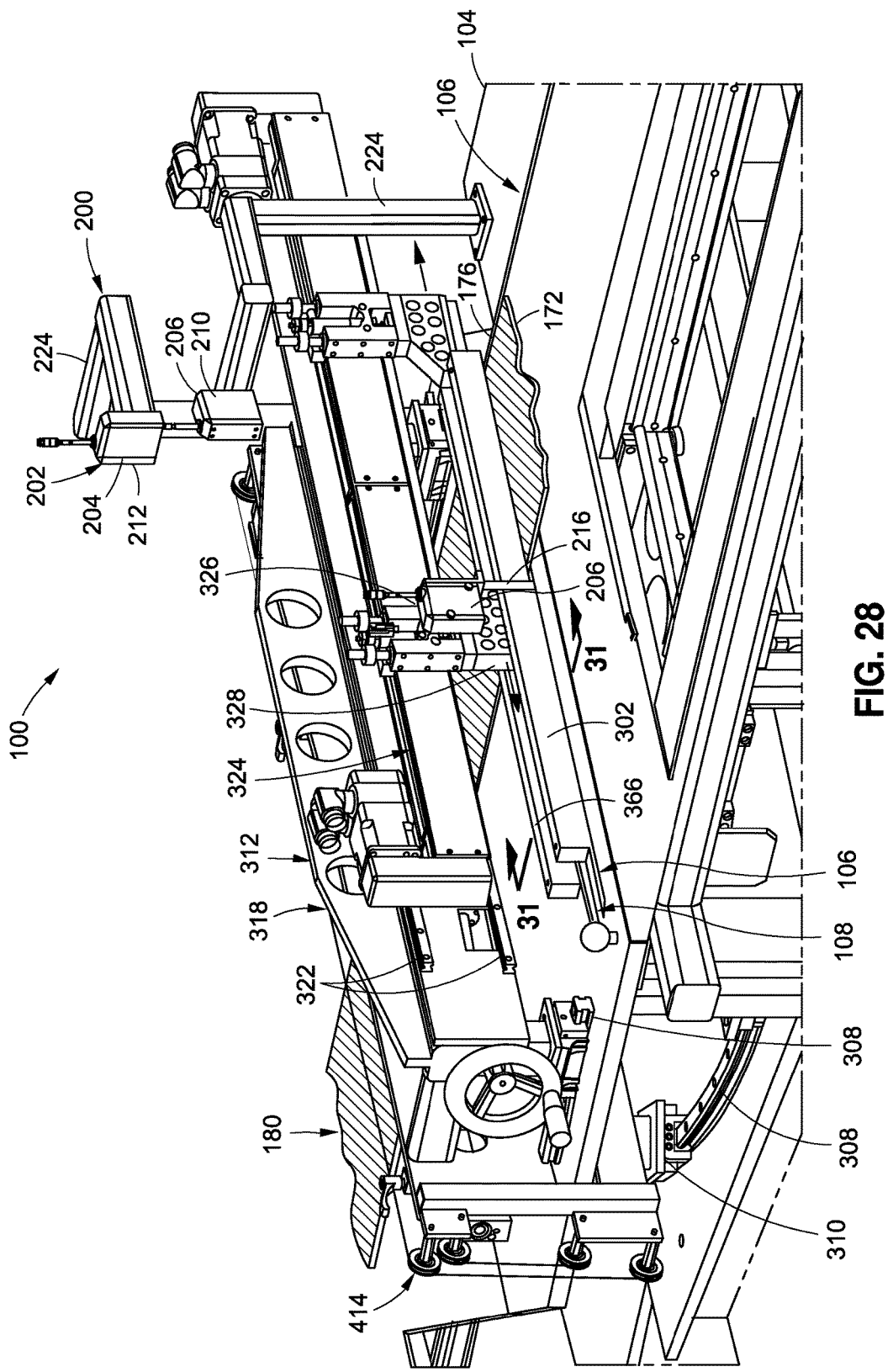
FIG. 28 is a perspective view of the welding shoes extended into contact with and sliding along the abutting end edges of the prepreg piece and prepreg layer to form a weld seam joining the abutting end edges.

FIGS. 26-28 illustrate an example of a process of forming a weld seam 166 to join a prepreg piece 172 to a prepreg layer 180 using a pair of welding shoes 328. Although a pair of welding shoes 328 is shown, the welding system 318 may include any number of welding shoes 328, including a single welding shoe 328 for forming the weld seam 166. In one example, the welding system 318 may include multiple shoes that may accommodate different weld seam 166 lengths. The welding shoes 328 may be provided in a length that may allow the welding shoes 328 to slide along the length of the weld seam 166 in the amount of time required to meet the desired cycle time from the start of the alignment process to the end of the welding process. In a further example not shown, the welding system 318 may include a single welding shoe 328 that may be limited to vertical movement to place the welding shoe 328 into contact with the top surface of the prepreg piece 172 and prepreg layer 180. Such a single welding shoe 328 may be provided in a length equal to a width of the weld seam to be formed such that translation of the welding shoe 328 along the weld seam 166 is not required.

FIG. 26 shows the welding shoes 328 of the welding system mounted on the bridge 312 which is translatable along the bridge guide tracks 314 on opposite ends of the bridge 312, as mentioned above. The bridge 312 is shown in a retracted position. One of the laser micrometers 210 in shown in a deployed position to allow for gap measurement between the end edges 174, 184 of the prepreg layer 180 and the prepreg piece 172 during the alignment process. As described above, the alignment system 200 may include a first pair 206 of laser micrometers 210 wherein each laser micrometer 210 may be located adjacent to a side edge 186 the prepreg layer 180 for measuring the gap between the end edges 174, 184 of the prepreg piece 172 and prepreg layer 180.

Figure 29:
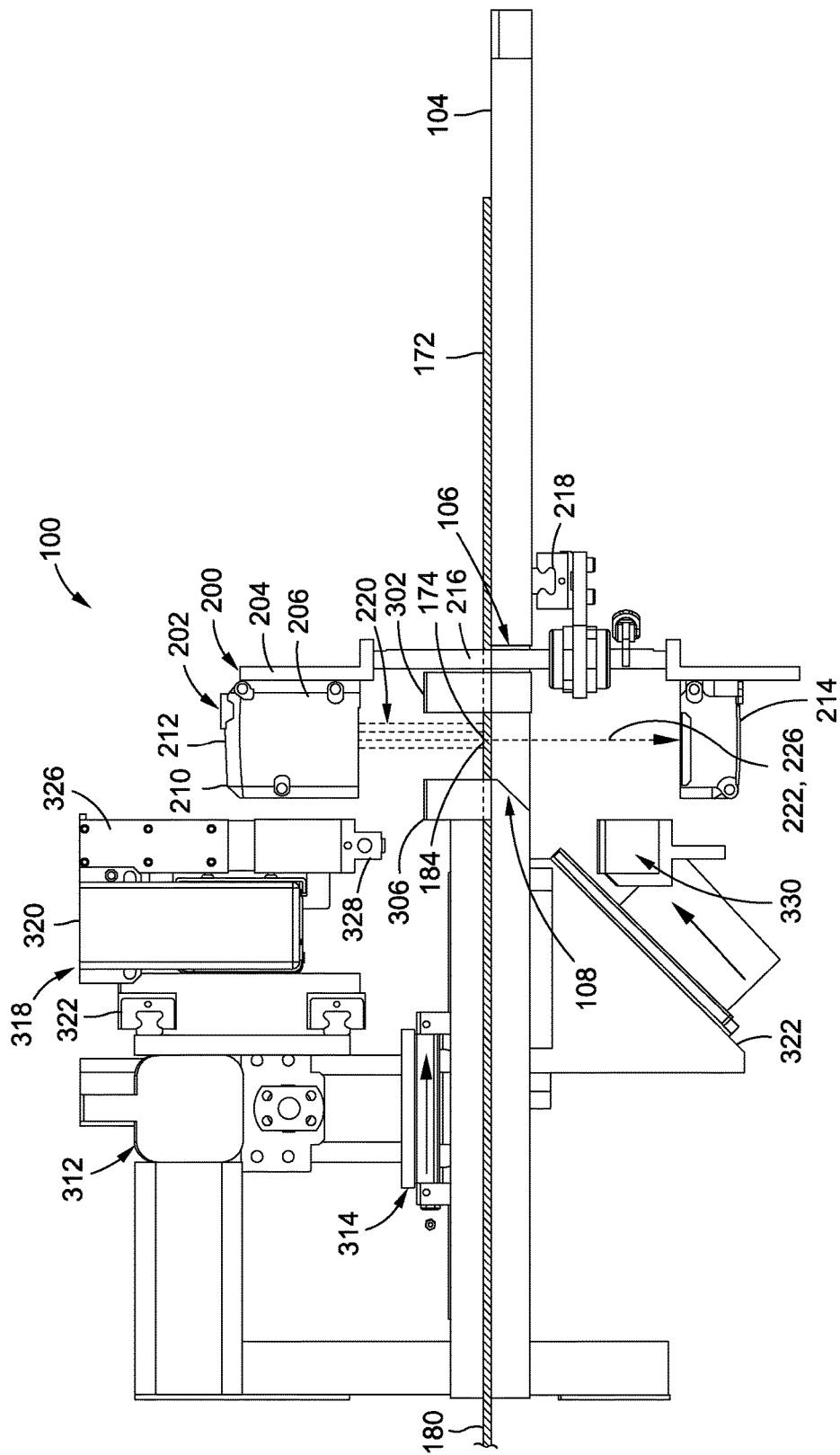
FIG. 29 is a sectional view of the welding system taken along line 29-29 of FIG. 26 and illustrating a deployable laser micrometer having a transmitter and a receiver located respectively above and below the tabletop and coupled by a connecting rod for rotatably deploying the transmitter and receiver into position for measuring a gap between the end edges of the prepreg piece and prepreg layer.

In FIG. 26, prior to initiating the off-axis material forming process, the prepreg layer 180 may be clamped in position against the tabletop 104 by the downstream clamp bar 306. The position of one of the laser micrometers 210 (e.g., the leftmost laser micrometer 210 in FIG. 26) may be adjusted along the alignment slot 106 such that the connecting rod 216 is located outboard of the side edge 176 of the prepreg piece 172. With the bridge 312 retracted during the alignment process, the laser micrometer 210 may be deployed into the position shown by rotating the connecting rod 216 as shown in FIG. 29 and described in greater detail below. Following the process of aligning the prepreg piece 172 with the prepreg layer 180, the upstream clamp bar 302 may be actuated to clamp the prepreg piece 172 into position against the clamp table.

FIG. 27 shows the retraction of the deployable laser micrometer 210 by rotating the connecting rod 216. Also shown is the translation of the bridge 312 along a lengthwise direction 188 to position the welding shoes 328 over the abutting end edges 174, 184 of the prepreg layer 180 and prepreg piece 172. The abutting end edges may be located between the upstream clamp bar 302 and the downstream clamp bar 306. In the example shown, the controller 192 may adjust the transverse position of the welding shoes 328 such that the welding shoes 328 are located at an approximate midpoint of the width of the prepreg layer 180. The welding shoes 328 may then be extended downwardly into the space between the upstream and downstream clamp bar 302, 306 until the welding shoes 328 contact the top surface of the prepreg layer 180 and prepreg piece 172 along the abutting end edges 174, 184.

FIG. 28 shows the welding shoes 328 in contact with the prepreg piece 172 and prepreg layer 180 and being translated (e.g., dragged) along the top surface of the abutting end edges 174, 184 from the mid-point of the width of prepreg piece 172 and prepreg layer 180 toward the opposing side edges 176, 186 of the prepreg piece 172 and prepreg layer 180. The welding shoes 328 may apply a predetermined amount of pressure to the prepreg piece 172 and prepreg layer 180 when sliding across the top surface. The pressure applied by the welding shoes 328 may be opposed by a retractable backing anvil 330 (e.g., see FIG. 31) that may be extended into position through a welding slot 108 formed in the tabletop 104, as described in greater detail below. However, in other examples, the backing anvil 330 may be omitted. For example, the prepreg piece 172 and prepreg layer 180 may be supported by the tabletop 104 underneath the location where the welding shoes 328 apply downward pressure onto the prepreg piece 172 and prepreg layer 180 along the length of the abutting end edges 174, 184.

The welding shoes 328 may be heated such that when placed in contact with the prepreg piece 172 and prepreg layer 180 for a sufficient period of time (e.g., the dwell period), the viscosity of the solid thermoplastic matrix of the prepreg piece 172 and the prepreg layer 180 may be temporarily reduced at the location where the welding shoes 328 are in contact with the prepreg piece 172 and prepreg layer 180. The reduced-viscosity thermoplastic material along the abutting end edges 174, 184 may at least partially intermingle such that when the welding shoes 328 are removed, the thermoplastic matrix may cool and re-solidify to form a weld seam 166 that may bind the prepreg piece 172 to the prepreg layer 180.

FIG. 29 is a sectional view of an example of a deployable laser micrometer 210 for gap measurement during the alignment of the prepreg piece 172. As indicated above, the laser micrometer 210 may include a transmitter 212 and a receiver 214 located respectively above and below the tabletop 104 and coupled by a connecting rod 216. The connecting rod 216 may be rotated (e.g., 90°) to place the transmitter 212 and receiver 214 of the laser micrometer 210 into position (e.g., as shown in FIG. 29) to allow the laser micrometer 210 to measure gap between the end edges 174, 184 of the prepreg piece 172 and prepreg layer 180 during the alignment process prior to moving the welding shoes 328 into position for forming the weld seam 166. The deployable laser micrometer 210 may be rotated back (e.g., see FIG. 31) into a retracted position to allow room for the welding shoes 328 to be translated into position by the movable bridge 312 to start the welding process.

Figure 30:
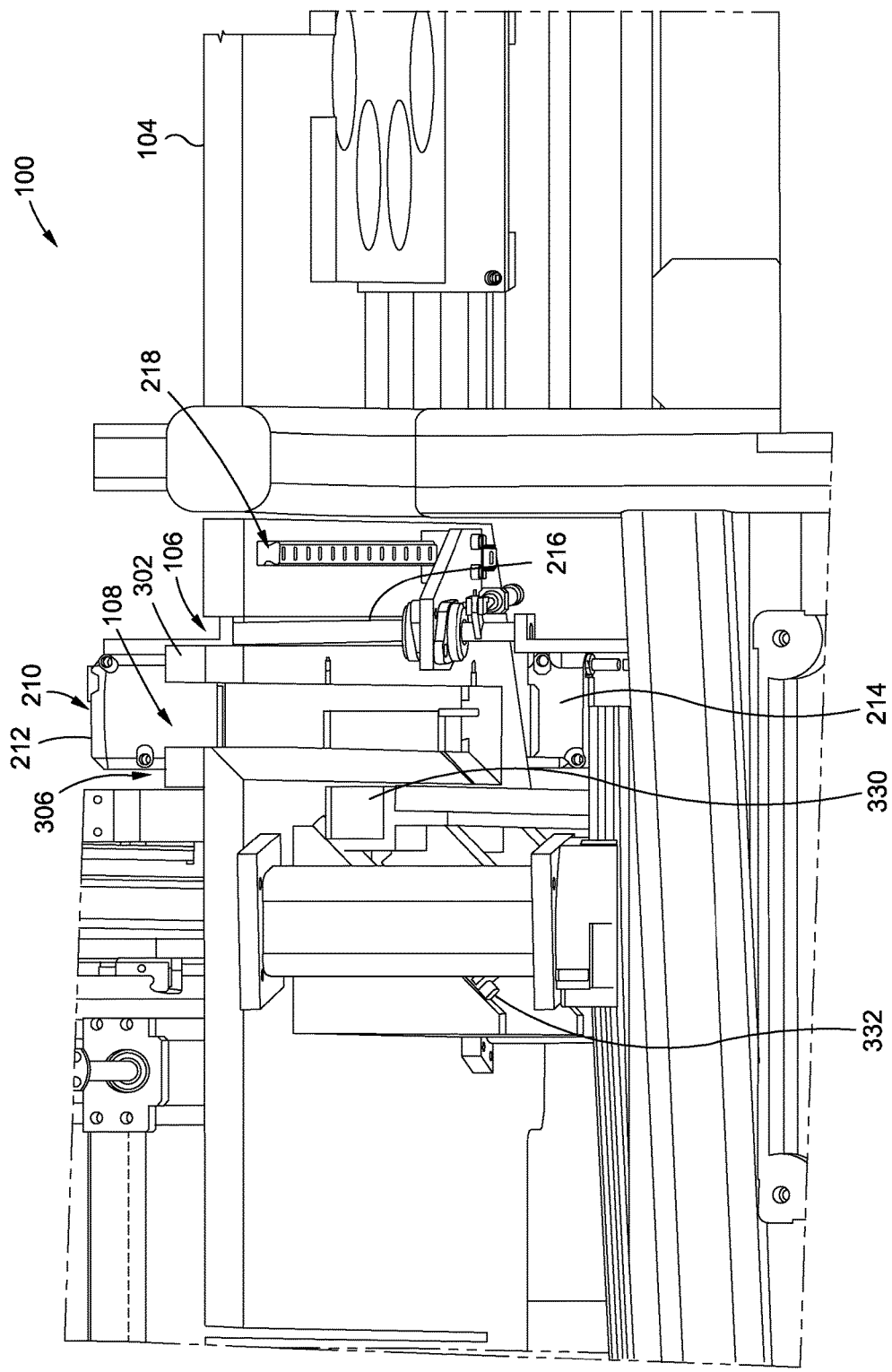
FIG. 30 is a perspective view of the transmitter and receiver of the laser micrometer of FIG. 29 and showing the connecting rod coupled to a sensor guide track for adjusting the transverse location of the laser micrometer relative to a side edge of a prepreg piece and prepreg layer to be welded together.

FIG. 30 shows the connecting rod 216 coupled to a sensor guide rail 218 mounted to the underside of the tabletop 104. Prior to starting the process of forming an off-axis material roll, the location of the connecting rod 216 and, therefore, the laser micrometer 210 may be adjusted to be complementary to the width of the prepreg layer 180 by activating a servo motor (not shown) to move the connecting rod 216 along the sensor guide rail. The position of the laser micrometer 210 may be adjusted such that the connecting rod 216 is positioned immediately adjacent to the side edge 176 of a new prepreg piece 172 without interfering with the positioning of the prepreg piece 172 by the robot 120. The laser micrometer 210 is preferably positioned along the side edge 176 such that when the connecting rod 216 is rotated to deploy the laser micrometer 210 into position for gap measurement, the optical beam 220 emitted by the laser micrometer 210 will impinge on the end edge 184 of the prepreg layer 180 and the prepreg piece 172.

Referring back to FIG. 29, shown is a retractable backing anvil 330 which may be mounted underneath the tabletop 104 and which is shown in a retracted position. The backing anvil 330 may be extended and retracted along an anvil guide rail 332 which may be oriented at an angle relative to the tabletop 104. In the example shown, the backing anvil 330 may be configured to move downwardly and to the left away from the welding slot 108 into the retracted position shown in FIG. 29 to avoid obstructing the gap measurement of the deployable laser micrometer 210. After the gap measurement process is completed, the deployable laser micrometer 210 may be retracted by rotating the connecting rod 216. The backing anvil 330 may be extended upwardly and to the right along the anvil guide rail 332 into the welding slot 108 until the upper surface of the backing anvil 330 is flush with tabletop 104 to support the prepreg piece 172 and prepreg layer 180 against downward pressure applied by the welding shoes 328.

FIG. 29 also shows an example of an arrangement for coupling the welding shoes 328 to the bridge 312. Each welding shoe 328 may be actuated (e.g., vertically extended and retracted) into contact with the top surface of the prepreg layer 180 and prepreg piece 172 using a welding shoe actuator 326. As indicated above, the welding shoe actuators 326 may be pneumatically driven for placing the welding shoes 328 into contact with the top surface of the prepreg piece 172 and prepreg layer 180 and for applying pressure against the prepreg piece 172 and prepreg layer 180 during forming of the weld seam 166. However, other means may be implemented for extending and retracting the welding shoes 328. For example, the welding shoe actuators 326 may be electromechanically actuated (e.g., extended and retracted) using an arrangement of one or more electric motors (not shown).

Each one of the welding shoe actuators 326 may also be coupled to one or more welding shoe guide tracks 324 of a welding shoe mounting block 320. In the example shown, each one of the welding shoe actuators 326 may be independently movable in coordination with one another such as by means of a servo motor rotating a jack screw (not shown) to which the welding shoe actuators 326 may be coupled. After the welding shoes 328 have been placed in contact with the prepreg piece 172 and prepreg layer 180, the servo motors may be actuated to horizontally translate (e.g., drag) each welding shoe 328 along the one or more welding shoe guide tracks 324. In the example shown, each one of the welding shoes 328 may be initially positioned at an approximate midpoint of the prepreg layer width and dragged toward a side edge 186 to form the weld seam 166.

Referring still to FIG. 29, the welding shoe mounting block 320 may be coupled to the bridge 312 by one or more mounting block guide tracks 322. The mounting block guide tracks 322 provide a means for accommodating different widths of the prepreg layer 180 so that the welding shoes 328 may be initially positioned at a midpoint of the prepreg layer width. In the example shown, a pair of welding shoes 328 may be initially positioned immediately adjacent one another. To adjust the initial position of the welding shoes 328 based on a new width of prepreg layer 180, one or more servo motors (not shown) may be activated by the controller 192 to position the welding shoes 328 at the approximate midpoint of the prepreg layer width.

Figure 31:
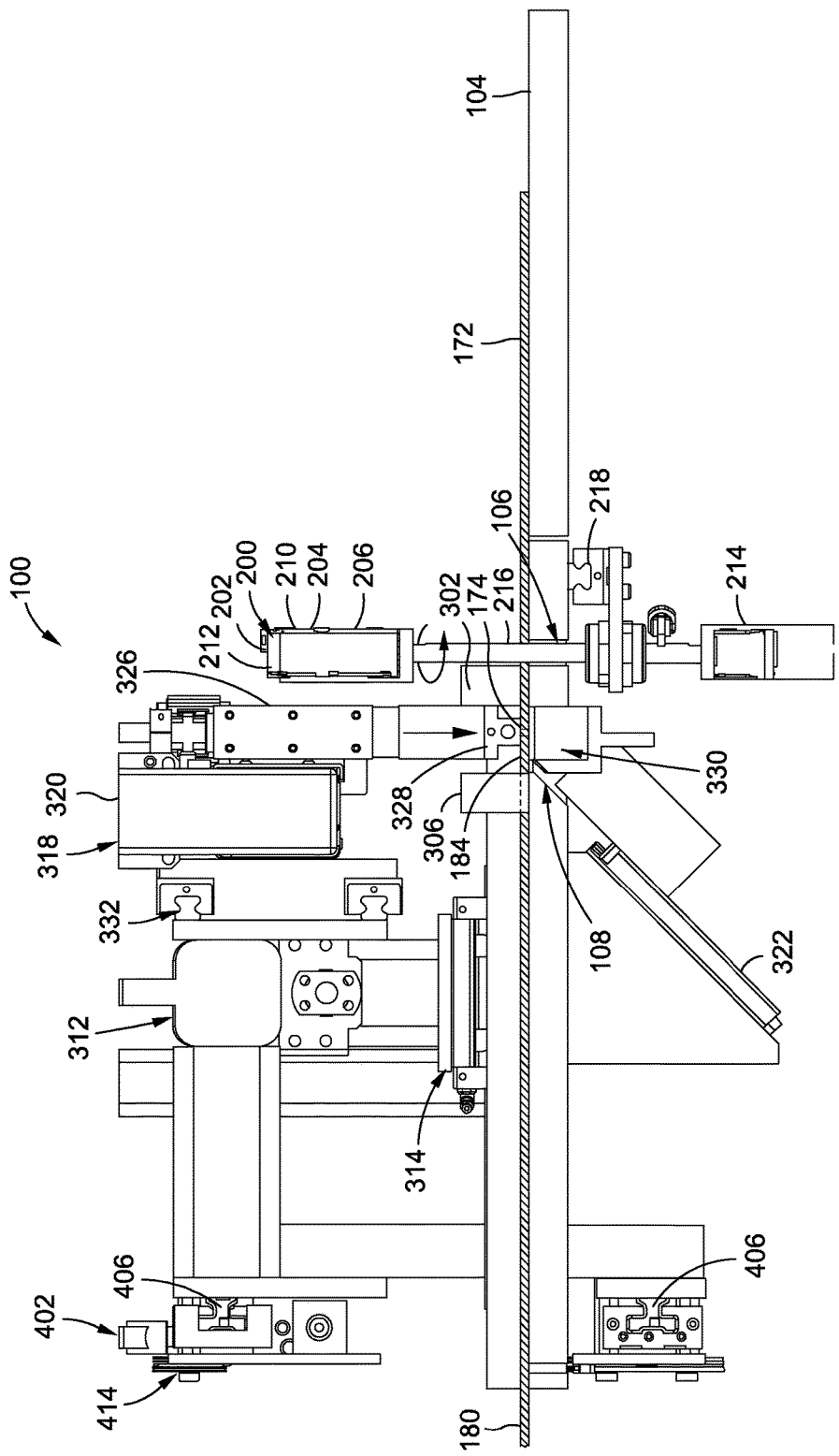
FIG. 31 is a sectional view of the welding system taken along line 31-31 of FIG. 28 and illustrating the transmitter and receiver rotated into a retracted position to allow a backing anvil mounted underneath the tabletop to extend through a welding slot in the tabletop and support an underside of the prepreg piece and prepreg layer against downward pressure applied by the welding shoes along the abutting end edges during forming of the weld seam.

FIG. 31 is a sectional view of the welding system 318 showing the transmitter 212 and receiver 214 of the laser micrometer 210 rotated into a refracted position to make room for the welding shoes 328 and the backing anvil 330. The backing anvil 330 is shown extended through the welding slot 108 formed in the tabletop 104. The backing anvil 330 supports an underside of the prepreg piece 172 and prepreg layer 180 against downward pressure applied by the welding shoes 328 along the abutting end edges 174, 184 during forming of the weld seam 166.

Each welding shoe 328 may be provided in a width that straddles the abutting end edges 174, 184 of the prepreg piece 172 and prepreg layer 180. In one example, each welding shoe 328 may have a width of less than approximately 1 inch and, more preferably, less than approximately 0.5 inch. When vertically actuated into position, the width of each welding shoe 328 is preferably equally divided between the prepreg piece 172 and prepreg layer 180. The bottom surface of each one of the welding shoes 328 may be generally rectangular in shape and may have beveled or rounded corners to prevent mark-off of the thermoplastic material.

Each welding shoe 328 may be translated along the top surface of the prepreg piece 172 and the prepreg layer 180 and may simultaneously apply pressure onto the abutting end edges. Each one of the welding shoes 328 may be heated at least along the bottom surface of the welding shoe. In one example, each welding shoe 328 may be provided with a strip heater that may extend along the length of the welding shoe 328 for uniform heating of the welding shoe 328 surface. The strip heater may be a resistance-type heating element that may be coupled to or integrated with the welding shoe. Alternatively, other means may be implemented for heating the welding shoe 328 including, but not limited to, inductive heating. In other examples, the welding process may involve directly heating the thermoplastic material such as by infrared heating (e.g., via an infrared lamp) or radiation heating to locally melt the thermoplastic material in front of a leading edge of each welding shoe 328 as the welding shoes 328 are moved along the abutting end edges 174, 184, with the welding shoes 328 applying downward pressure onto the abutting end edges 174, 184 against the backing anvil 330 to facilitate intermingling of the melted thermoplastic of the end edges 174, 184 for joining the prepreg piece 172 to the prepreg layer 180.

The portion of the welding shoe 328 in contact with the thermoplastic material is preferably formed of a material having a relatively high thermal conductance and a low coefficient of friction. In one example, the welding shoes 328 may be formed of bronze, copper, and/or brass or other suitable metallic and/or nonmetallic material for conducting heat into the thermoplastic material. In some examples, a coating may be applied to the welding shoes 328 to prevent buildup of residue and to improve the durability of the welding shoe contact surface to reduce abrasive wear. The welding shoe material and heater may be configured to allow for relatively precise heating control of the welding shoe within a relatively narrow temperature tolerance band. The configuration of the welding shoe and the heater is preferably such that the thermoplastic material of the prepreg piece 172 and prepreg layer 180 are locally melted (i.e., reduced in viscosity) and re-solidified in a relatively short period time (e.g., several seconds) to reduce the cycle time for forming each weld seam.

In some examples, the portion of the backing anvil 330 in contact with the prepreg piece 172 and prepreg layer 180 may also be formed of a metallic material (e.g., bronze, copper, and/or brass) and/or a non-metallic material having a relatively high thermal conductance and may be heated to assist the welding shoes 328 in forming the weld seam 166. In some examples, the backing anvil 330 may include a heating device such as a resistance-type heating element or an inductive heating mechanism the system welding process. In any of examples disclosed herein, the welding shoes 328 and/or the backing anvil 330 may incorporate a liquid cooling system (not shown) to facilitate cooling of the welding shoes 328. For example, a trailing edge portion of each welding shoe 328 may be actively cooled to facilitate re-solidification of the melted thermoplastic material of the prepreg piece 172 and prepreg layer 180 as a means to reduce the cycle time of the welding process. Although not shown, one or more of the welding shoes 328 may include one or more pressure sensors configured to sense the magnitude of the pressure applied by the welding shoe 328 onto the thermoplastic material. A signal representing the welding shoe 328 pressure may be transmitted in real time to the controller 192 to allow for monitoring and modulating of the pressure applied by the welding shoes 328.

Figure 32:
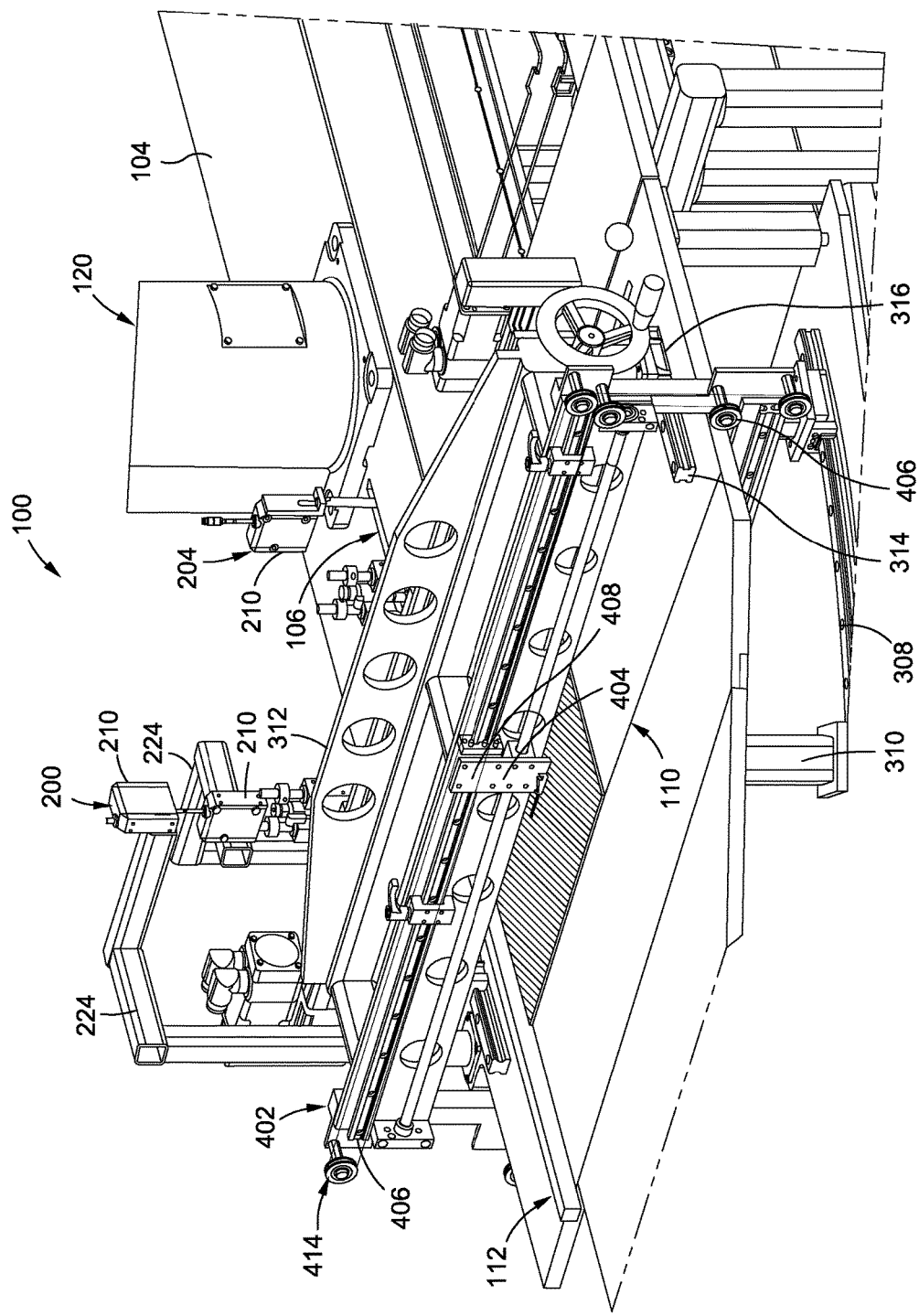
FIG. 32 is a top perspective view of an example of an inspection system for inspecting a weld seam for the presence of through-thickness gaps.
Figure 33:
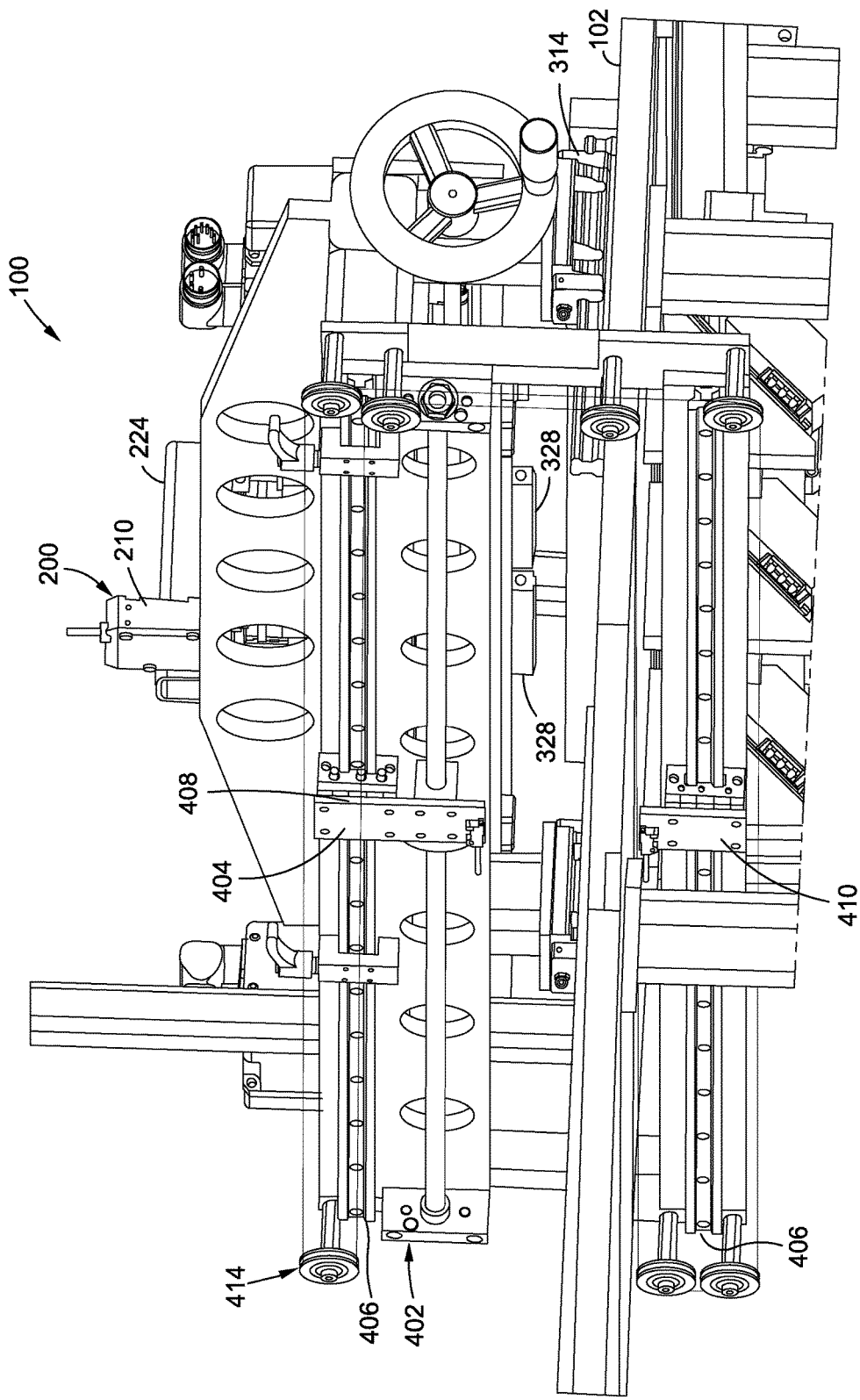
FIG. 33 is a further perspective view of the inspection system showing an underside of the tabletop and a pulley system for synchronized movement of a fiber optic sensor and a receiver respectively mounted above and below the tabletop for inspecting a weld seam for through-thickness gaps.

FIG. 32 is a perspective view of an example of an inspection system 402 for inspecting a weld seam 166 for the presence of through-thickness gaps (not shown). FIG. 33 is a perspective view of an underside of the tabletop 104 showing a pulley system 414 for synchronized movement of a fiber optic sensor 408 above the tabletop 104 and a scanner receiver 410 below the tabletop 104. The fiber optic sensor 408 and/or scanner receiver 410 may be coupled to an inspection guide track 406 which may be mounted to the bridge 312. The fiber optic sensor 408 may be stabilized against lateral movement by a guide rod extending along the length of the bridge 312. A servo motor (not shown) may translate the fiber optic sensor 408 over the weld seam 166 as the fiber optic sensor 408 emits a scanner beam 412. The pulley system 414 may be configured such that the scanner receiver 410 remains positioned directly below the fiber optic scanner as the fiber optic sensor 408 is translated along the weld seam 166. As indicated above, the fiber optic sensor 408 may continuously emit a scanner beam 412 downwardly onto the weld seam 166 during inspection process. If the scanner beam 412 passes through any through-thickness gaps (not shown) in the weld seam 166, the scanner beam 412 will impinge upon the scanner receiver 410 and which may trigger the scanner receiver 410 to generate and transmit a signal to the controller 192. Upon receiving the signal from the scanner receiver 410, the controller 192 may generate an audible and/or visual alarm to alert an operator so that the through-thickness gap can be manually inspected.

Figure 34:
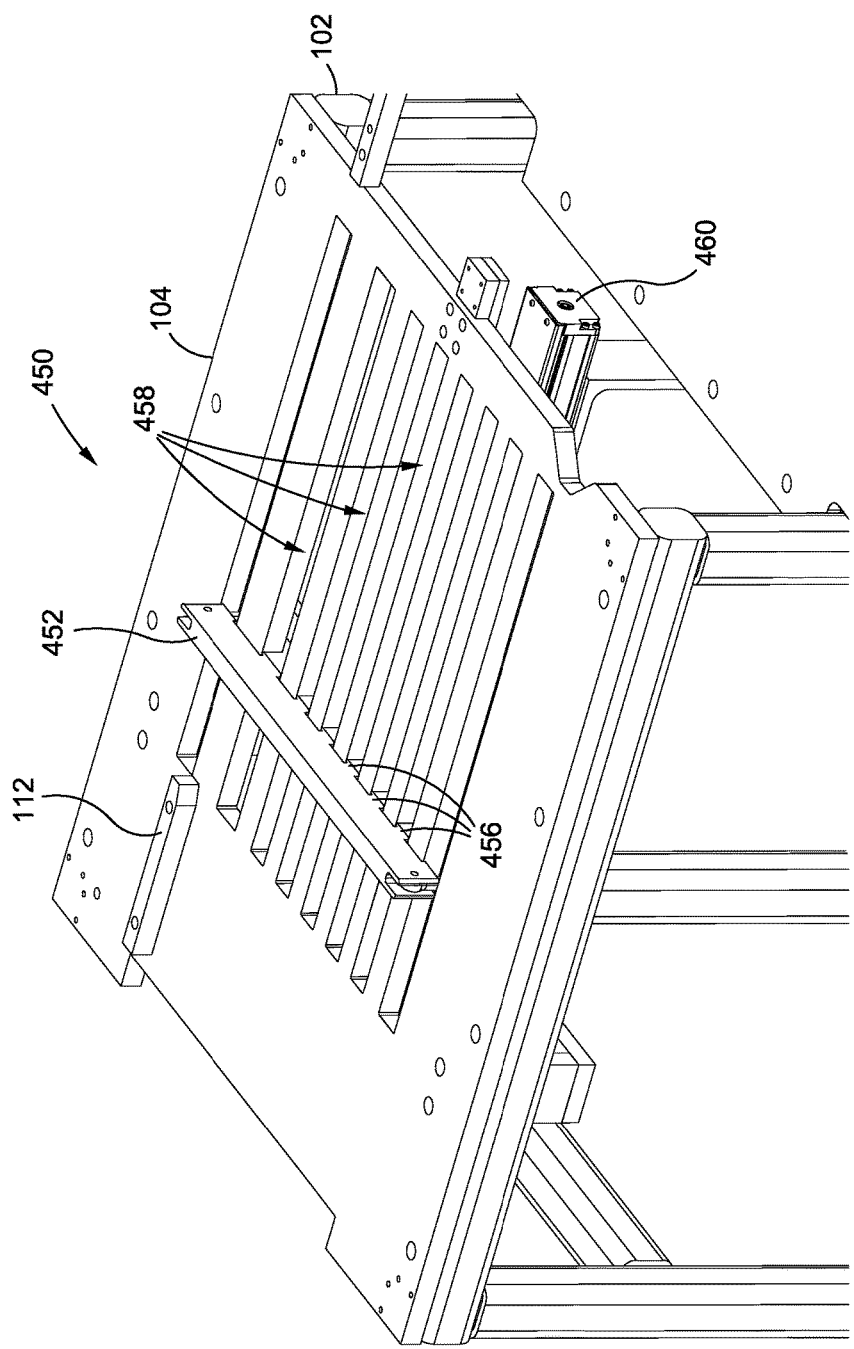
FIG. 34 is a top perspective view of the tabletop of the machine showing an example of a material advancer having an upper advancer bar for advancing the prepreg layer after forming a weld seam.
Figure 35:
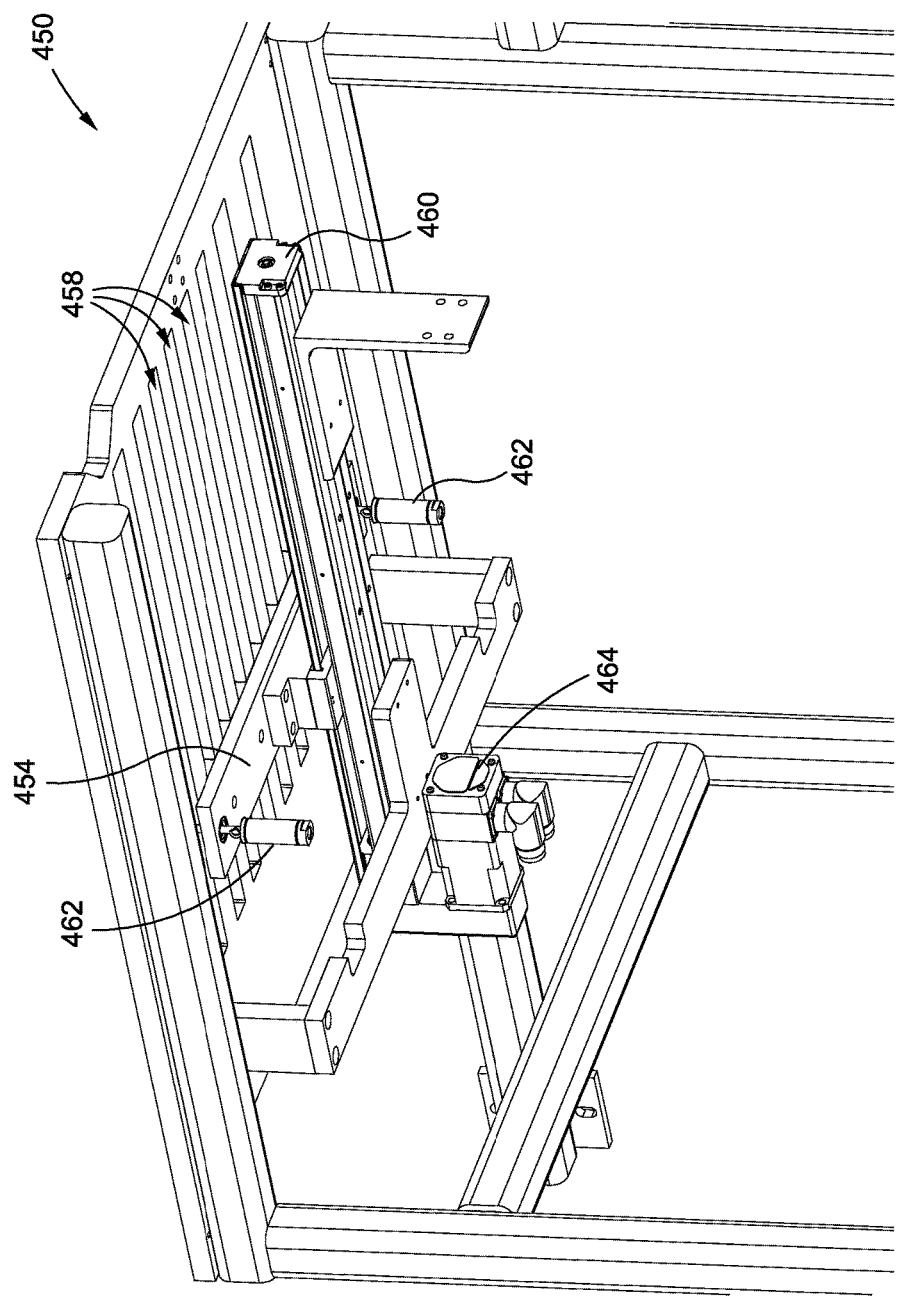
FIG. 35 is a bottom perspective view of an underside of the tabletop showing a lower advancer bar operably coupled to the upper advancer bar for advancing the prepreg layer.

FIGS. 34-35 show an example of a material advancer 450 for advancing the prepreg layer 180 after the forming of each weld seam 166. The material advancer 450 may be located downstream of the inspection station 400 and/or downstream of the welding station 300. The material advancer 450 may periodically translate or pull the prepreg layer 180 along the tabletop 104 until the end edge 184 of the prepreg layer 180 is positioned at the welding station 300. The advancement of the prepreg layer 180 may move the most-recently-formed weld seam 166 from the welding station 300 to the inspection station 400 downstream of the welding station 300.

FIG. 34 is a perspective view of the material advancer 450 having an upper advancer bar 452. FIG. 35 is a perspective view of an underside of the tabletop 104 showing a lower advancer bar 454 operably coupled to the upper advancer bar 452. After the forming of a weld seam 166, the upper advancer bar 452 may be actuated vertically downwardly by a pair of advancer actuators 462 on opposite ends of the upper advancer bar 452 to clamp the prepreg layer 180 against the tabletop 104 with an amount of pressure sufficient to prevent slippage of the prepreg layer 180 relative to the upper advancer bar 452.

In the example shown, the upper advancer bar 452 may include advancer bar feet 456 extending at least partially through a plurality of corresponding advancer bar slots 458 formed in the tabletop 104 to clamp the prepreg layer 180. Alternatively, the lower advancer bar 454 may include advancer bar feet 456 (not shown) extending upwardly for clamping the prepreg layer 180 to the upper advancer bar 452. In some examples, the ends of one or more of the advancer bar feet 456 may be at least partially covered with a relatively soft material such as a viscoelastic or resiliently-conformable pad on the ends of the feet to avoid mark-off of the prepreg layer 180 during clamping. The lower advancer bar 454 may be coupled to an advancer guide track 460 which may be driven by an advancer motor 464 for moving the upper and lower advancer bar 452, 454. The advancer actuators 462 and the advancer motor 464 may be actuated by the controller 192 to respectively clamp the prepreg layer 180 and advance the prepreg layer 180 to move a recently-formed weld seam 166 out of the welding station 300 and position the new end edge 184 of the prepreg layer 180, formerly the end edge 174 of the prepreg piece 172, at the welding station 300.

Figure 36:
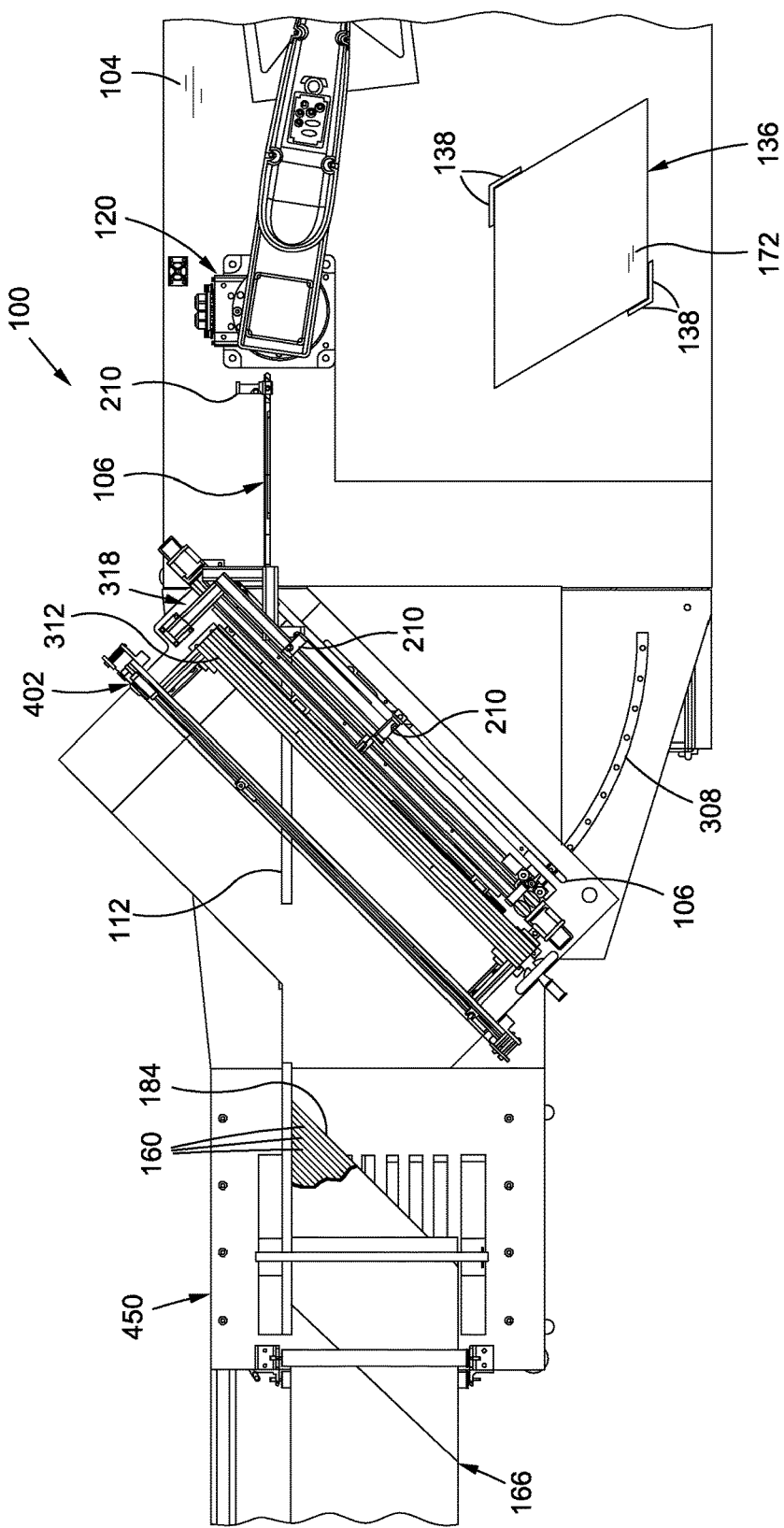
FIG. 36 is a top view of an example of the machine with the welding system oriented at a 45° angle relative to a lengthwise direction of the prepreg layer for forming a 45° material roll.

FIG. 36 is a top view of an example of a manufacturing machine 100 having a welding system 318 oriented at a 45° angle relative to a lengthwise direction 188 of the prepreg layer 180 for forming a 45° material roll 154. An inspection system 402 may also be included with the welding system 318 and may be supported on the bridge 312 and oriented at the same angle as the welding system 318. The guide plates 138 of the input hopper 136 may be configured for receiving a prepreg stack 170 of prepreg pieces 172 have a 45° fiber orientation (e.g., see FIG. 10). The welding system 318 may be supported on arc-shaped guide rails 308 to allow for pivoting and locking of the welding system 318 into an orientation corresponding to the configuration and geometry of the prepreg pieces 172 to be seam-welded.

Figure 37:
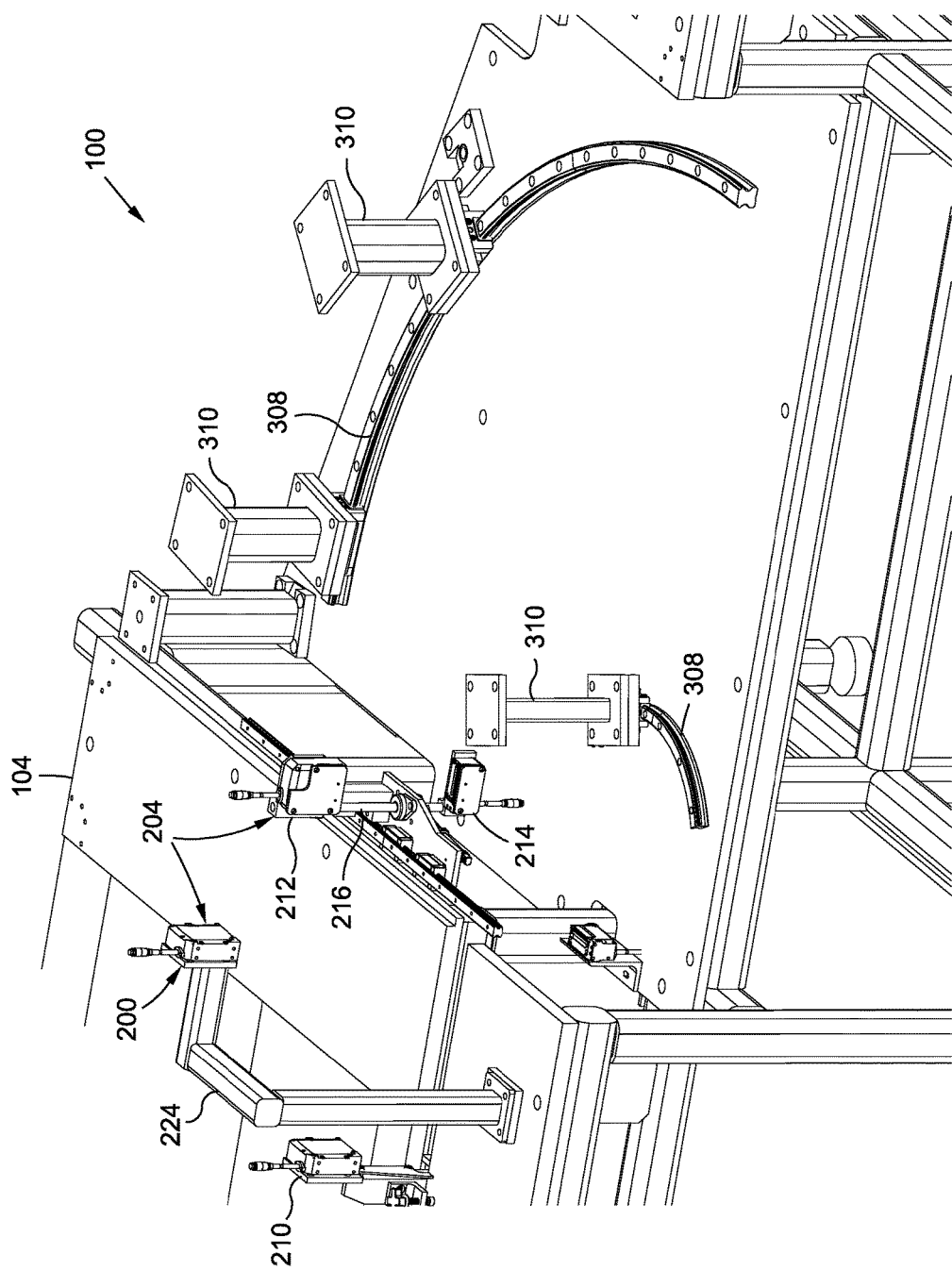
FIG. 37 is a perspective view of a pair of arc-shaped guide rails for pivoting a welding system into any one of a variety of orientations relative to a lengthwise direction of the prepreg layer.

FIG. 37 is a perspective view of an example of a machine 100 with a portion of the tabletop 104 removed to illustrate a pair of arc-shaped guide rails 308 for pivoting the welding system 318. In this regard, the pivoting of the welding system 318 into any one of a variety of orientations provides a means for forming weld seams 166 at different angles for end-to-end welding of prepreg pieces 172 to form an off-axis material roll in any one of a variety of fiber orientations (e.g., 22.5°, 30°, 45°, 60°, 75°, etc.). The pivoting welding system 318 may be mounted on one or more welding system 318 support posts 310 which, in turn, may be mounted to fittings that are engaged to the arc-shaped guide rails 308. The tabletop 104 of the welding system 318 may be modular such that portions of the tabletop 104 may be removed and/or installed such that a continuous surface is provided for supporting the prepreg layer 180 during the manufacturing process regardless of the orientation the welding system 318.

Figure 38:
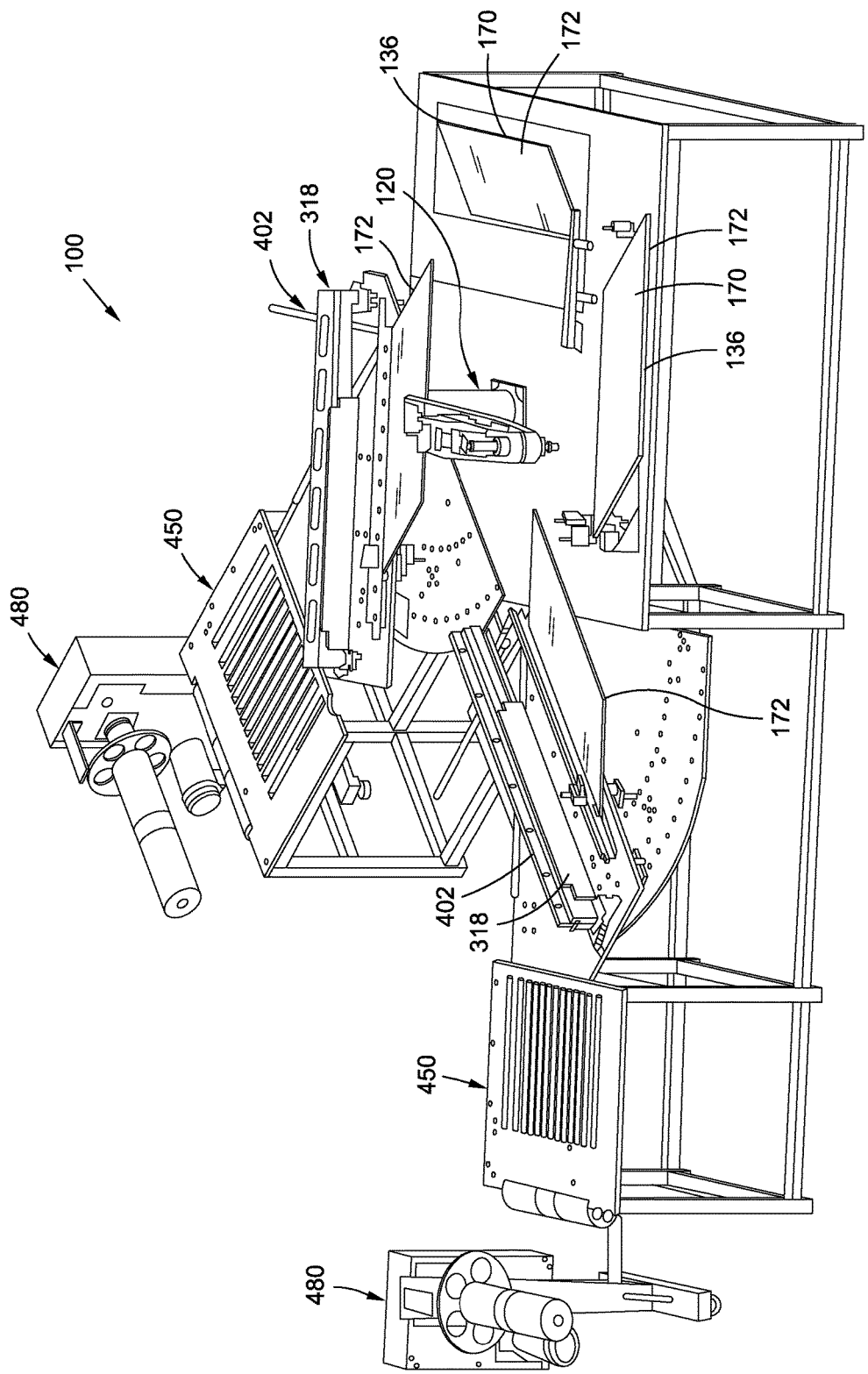
FIG. 38 is a perspective view of an example of an off-axis material roll manufacturing machine having a single robot and two welding stations for forming two off-axis material rolls.

FIG. 38 is a perspective view of an example of a material roll manufacturing machine 100 having a single robot 120 and two (2) welding systems 318 for simultaneously manufacturing two (2) off-axis material rolls at a relatively high rate. Each one of the welding systems 318 is shown oriented at a non-perpendicular angle relative to a lengthwise direction 188 of the prepreg layer 180 in order to produce off-axis material rolls with fibers 160 oriented non-perpendicular to the lengthwise direction 188 of the prepreg layer 180. For example, each one the welding systems 318 may be oriented at 45° relative to the lengthwise direction 188 of the prepreg layer 180 for producing 45° material rolls 154 (e.g., see FIG. 11). The robot 120 and the welding systems 318 may be controlled by the controller 192 as may the inspection systems 402, the material advancers 450, and the material winders 480.

FIG. 39 is a flowchart having one or more operations that may be included in a method 500 of manufacturing an off-axis thermoplastic prepreg material roll. Step 502 of the method may include picking up, using a vacuum head 128, an uppermost prepreg piece 172 such as from the top of a prepreg stack 170 positioned in an input hopper 136. As indicated above, the operation of the robot 120 may be commanded by the controller 192 which may also control the application of vacuum to the vacuum head 128 for picking up the prepreg piece 172 from the input hopper 136.

In some examples, the input hopper 136 may include the capability for inspecting the prepreg pieces 172 prior to pickup by the vacuum head 128. For example, the input hopper 136 may include one or more sensors (not shown) for measuring the geometry and dimensions of the uppermost prepreg piece 172 in the input hopper 136 prior to the vacuum head 128 picking of the prepreg piece 172. The one or more sensors may inspect the top prepreg piece 172 for parallelism and straightness of side edges 176 and end edges 174 and/or may inspect the accuracy of the corner angles of the prepreg piece 172. If any of the measurements are outside of a predetermined tolerance band, a signal may be sent to the controller 192 for generating an audible or visual alarm to alert the operator prior to the prepreg piece 172 being welded to the existing prepreg layer 180.

Step 504 of the method 500 may include positioning, using the robot 120, the prepreg piece 172 adjacent to an end 182 of a prepreg layer 180. As indicated above, the robot 120 may position the prepreg piece 172 such that an end edge 174 of the prepreg piece 172 is within a predetermined distance of the end edge 184 of the prepreg layer 180. In addition, the robot 120 may orient the prepreg piece 172 such that the end edge 174 and/or the side edge 176 of the prepreg piece 172 is roughly parallel (e.g., within 0.5°) of the end edge 184 and/or the side edge 186 of the prepreg layer 180.

In some examples, the method may include the retracting, using a movable bridge 312, the welding shoes 328 away from the location of the abutting end edges 174, 184 while detecting and adjusting the position of the prepreg piece 172 relative to the prepreg layer 180. As indicated above, the movable bridge 312 may be located at the welding station 300 and may be configured to support the welding system 318 and the inspection system 402. Once the prepreg piece 172 is aligned with the prepreg layer 180, the bridge 312 may be adjustably translated along a lengthwise direction 188 of the prepreg layer 180 to position the welding shoes 328 over the abutting end edges 174, 184 prior to and during the welding operation. After the welding operations completed, the bridge 312 may be retracted away from the location of the weld area to allow room for the alignment system 200 for measuring a gap between the end edges 174, 184 of a new prepreg piece 172 and the prepreg layer 180.

Step 506 of the method 500 may include sensing, using the alignment system 200, the position (e.g., the location and/or the orientation) of the prepreg piece 172 relative to the prepreg layer 180, and generating a position signal representative thereof. As indicated above, the alignment system 200 may include one or more optical sensors 204 which may be configured as laser micrometers 210 as shown in FIGS. 12-14. The laser micrometers 210 may transmit to the controller 192 a position signal representative of the gap measurements.

Step 508 of the method 500 may include receiving, at the controller 192, the position signal and determining an aligned position of the prepreg piece 172 relative to the prepreg layer 180. The controller 192 may calculate the aligned position of the prepreg piece 172 relative to the prepreg layer 180 based on the gap measurements. For example, the controller 192 may use the gap measurement data provided by the first pair 206 of optical sensors 204 (e.g., see FIG. 15) to determine a distance and orientation of the side edge 176 of the prepreg piece 172 relative to the indexing feature 112 other machine 100. The controller 192 may use the gap measurement data provided by the second pair 208 of optical sensors 204 to determine a distance and orientation of the end edge 174 of the prepreg piece 172 relative to the end edge 184 of the prepreg layer 180.

Step 510 of the method 500 may include adjusting or moving (e.g., translating and/or rotating or reorienting), using the robot 120, the prepreg piece 172 into the aligned position such that an end edge 174 of the prepreg piece 172 and an end edge 184 of the prepreg layer 180 are in substantially abutting contact (e.g., within 0.030 inch). As the robot 120 is moving the prepreg piece 172 into the aligned position, the optical sensors 204 may continuously generate position signals representative of the gap measurements and provide continuous feedback to the controller 192 in the form of continuous position signals. The controller 192 may adjust the location and orientation of the prepreg piece 172 based on the position signals until the end edge 174 and side edge 176 of the prepreg piece 172 are within a predetermined distance (e.g., within 0.010 inch) of the end edge 184 and sides edge 186 of the prepreg layer 180 and/or within a predetermined parallelism tolerance (e.g., within 0.05°).

The method may further include clamping, using at least one clamp bar, the prepreg layer 180 in position prior to a lining the prepreg piece 172 with the prepreg layer 180. For example, as indicated above, the prepreg layer 180 may be clamped to the tabletop 104 using the downstream clamp bar 306 as shown in FIG. 26. Once the prepreg piece 172 is aligned with prepreg layer 180, the method may additionally include clamping, using an upstream clamp bar 302, the prepreg layer 180 in position prior to and during the welding of the end edges 174, 184 of the prepreg piece 172 and the prepreg layer 180.

Step 512 of the method 500 may include forming a weld seam 166 joining the end edge 174 of the prepreg piece 172 to the end edge 184 of the prepreg layer 180. As indicated above, the bridge 312 may translate the welding shoes 328 into position directly above the abutting end edges 174, 184 of the prepreg piece 172 and prepreg layer 180. The welding shoe actuators 326 may extend the welding shoes 328 into contact with the top surface of the prepreg piece 172 and prepreg layer 180. In some examples, the method may include extending a backing anvil 330 from underneath the tabletop 104 into a welding slot 108 formed in the tabletop 104. As indicated above, the backing anvil 330 may be configured to support the bottom surface of the prepreg piece 172 and prepreg layer 180 when the welding shoes 328 are applying downward pressure onto the top surface of the prepreg piece 172 and prepreg layer 180 when forming the weld seam 166. After completion of the weld seam 166, the backing anvil 330 may be retracted out of the welding slot 108 to allow room for deployment of one or more laser micrometers 210 for gap measurement between the end edge 174 of a new prepreg piece 172 and the end edge 184 of the prepreg layer 180.

The process of forming a weld seam 166 may include applying at least one welding shoe 328 against the top surface of the prepreg piece 172 and prepreg layer 180 at a location of the abutting end edges 174, 184 such that the welding shoe 328 straddles the abutting end edges 174, 184. The method may include sliding a pair of the welding shoes 328 along the top surface such as from a midpoint of the prepreg layer width to the opposing side edges of the prepreg layer 180 (e.g., see FIGS. 27-28). The method may additionally include applying, using the welding shoes 328, localized heat and pressure to the prepreg piece 172 and prepreg layer 180 to cause at least partial melting and intermingling of the thermoplastic matrix material of the prepreg piece 172 and prepreg layer 180 along the abutting end edges 174, 184 while sliding the welding shoes 328 along the top surface of the prepreg piece 172 and prepreg layer 180. The method may further include allowing the at least partially melted thermoplastic matrix material of the prepreg piece 172 and prepreg layer 180 to solidify and form the weld seam 166.

The method may include forming weld seams 166 along a direction either perpendicular to the lengthwise direction 188 of the prepreg layer 180 or non-perpendicular to the lengthwise direction 188 of the prepreg layer 180. For example, FIGS. 2-8 and 12-32 are directed toward producing a 90° material roll 156 (e.g., see FIG. 8) by orienting the welding system 318 and welding shoes 328 perpendicular to the lengthwise direction 188 of the prepreg layer 180. FIGS. 36-38 illustrate an arrangement wherein the welding system 318 is oriented at a 45° angle relative to the lengthwise direction 188 of the prepreg layer 180 for forming 45° weld seams 166 to produce a 45° material roll 154 (e.g., see FIG. 11).

In some examples, the method may include monitoring and/or regulating, using the controller 192, one or more welding parameters including, but not limited to, the pressure, temperature, speed, and/or dwell time of one or more of the welding shoes 328. In this regard, the machine 100 may include one or more temperature sensors (not shown) configured to monitor the temperature of the welding shoes 328 and/or monitor the temperature of the prepreg piece 172 and prepreg layer 180 at the location of the abutting end edges. Such temperature data may be transmitted to the controller 192.

The controller 192 may modulate the operation of the welding shoes 328 to maintain the welding parameters within a certain range. For example, in one embodiment, the operation of the welding shoes 328 may be such that during welding, heat is applied to the thermoplastic material at any given location along the abutting end edges 174, 184 for a maximum of twenty (20) seconds. In another example, the temperature of the thermoplastic control may be maintained within approximately 390-450° C. (734-842° F.). In a still further example, the magnitude of the pressure applied by the welding shoes 328 along the abutting end edges 174, 184 may be maintained within 2-6 bars (29-87 psi).

The method may include adjusting, using an operator interface 196 (e.g., a display screen 198 or touch screen) one or more operating parameters of the machine 100. For example, the operating parameters that may be adjusted include the temperature, pressure, dwell period, and/or shoe speed of the welding shoes 328. Additional operating parameters that may be adjusted using the operator interface 196 may include the pre-weld alignment tolerances for the gap between end edges 174, 184 of the prepreg piece 172 and prepreg layer 180, the gap tolerances for the side edge 176 of the prepreg piece 172 to the indexing feature 112, the parallelism of the side edges 176 of the prepreg piece 172 relative to the indexing feature 112, the post-weld inspection of the weld seam 166 such as the maximum permissible size of through-thickness gaps, and other operating parameters.

Step 514 of the method 500 may include inspecting, using a gap detector 404 (e.g., a fiber optic scanner), the weld seam 166 for the presence of through-thickness gaps. In this regard, the method may include translating the gap detector 404 along a length of the weld seam 166 to detect the presence of through-thickness gaps. Upon the detection of a through-thickness gap in the weld seam 166, the method may include sending a signal to the controller 192 for generating an alarm to alert an operator. The signal may include information regarding the location of the gap along the weld seam 166 length for display such as on the display screen 198.

The method may additionally include scanning the prepreg layer 180 for the presence of any overlaps 420 in a recently-formed weld seam 166. In this regard, the method may include measuring, using an overlap sensor 416, a thickness of the prepreg layer 180 at one or more locations along a transverse direction 190 of the weld seam 166. The thickness of the prepreg layer 180 may be measured as the prepreg layer 180 is advanced along the tabletop 104 after a weld seam 166 has been formed and is being moved to the inspection slot.

The method may also include advancing, using a material advancer 450, the prepreg layer 180 after forming of the weld seam 166 such that the new end edge 184 of the prepreg layer 180, formerly the end edge 174 of a prepreg piece 172, is moved to the welding station 300 in preparation to have a new prepreg piece 172 aligned and welded to the end edge 184 of the prepreg layer 180. The advancement of the prepreg layer 180 may also move the most-recently-formed weld seam 166 from the welding station 300 to an inspection station 400 (e.g., the inspection slot) located downstream of the welding station 300. The material advancer 450 may advance the prepreg layer 180 in a semi-continuous manner wherein a newly-formed weld seam 166 is moved from the welding station 300 to an inspection station 400 as the new end edge 184 of the prepreg layer 180 is moved to the welding station 300.

The method may additionally include winding, using a material winder 480, the prepreg layer 180 onto a core 482. In some examples, the winding of the prepreg layer 180 may be performed in coordination with the above-described advancement of the prepreg layer 180 by the material advancer 450. In this regard, the controller 192 may coordinate the actuation of the core drive motor 484 for the material winder 480 with the actuation of the server motor for the material advancer 450.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An off-axis prepreg material manufacturing machine, comprising:
   a robot configured to position a prepreg piece adjacent to an end of a prepreg layer;
   an alignment system configured to sense a position of the prepreg piece relative to the prepreg layer and generate a position signal representative thereof;
   a controller configured to receive the position signal and cause the robot to adjust the position of the prepreg piece such that an end edge of the prepreg piece and an end edge of the prepreg layer are in substantially abutting contact; and
   at least one welding shoe configured to be translated along a top surface of the abutting end edges of the prepreg piece and prepreg layer and locally heat the abutting end edges and form a weld seam joining the prepreg piece to the prepreg layer.

2. The machine of claim 1, wherein:
   the alignment system comprises a vision system configured to detect a location and orientation of the end edge of the prepreg piece relative to the end edge of the prepreg layer.

3. The machine of claim 1, wherein:
   the alignment system comprises a vision system configured to detect a location and orientation of a side edge of the prepreg piece relative to the side edge of the prepreg layer.

4. The machine of claim 1, wherein:
   the alignment system includes a first pair of laser micrometers configured to measure the position of the end edges of the prepreg piece and prepreg layer relative to one another, and a second pair of laser micrometers configured to measure the position of side edges of the of the prepreg piece and prepreg layer relative to one another.

5. The machine of claim 1, further comprising:
   an input hopper configured to support a prepreg stack of prepreg pieces for pickup by the robot.

6. The machine of claim 1, wherein:
the robot includes a vacuum head configured to use suction force to lift and retain the prepreg piece against the vacuum head.

7. The machine of claim 1, wherein:
the at least one welding shoe comprises a pair of welding shoes initially positioned at an approximate midpoint of the prepreg layer width and each being translated toward one of opposing side edges of the prepreg piece and prepreg layer to apply heat to abutting end edges of the prepreg piece and prepreg layer and form the weld seam joining the prepreg piece to the prepreg layer.

8. The machine of claim 1, further comprising:
a backing anvil configured to support the prepreg piece and prepreg layer against pressure applied by the at least one welding shoe onto the prepreg piece and prepreg layer during the forming of the weld seam.

9. The machine of claim 1, further comprising:
a bridge configured to support the at least one welding shoe and being adjustably translatable along a lengthwise direction of the prepreg layer to position the welding shoe over abutting end edges of the prepreg piece and prepreg layer.

10. The machine of claim 1, wherein:
an orientation of the at least one welding shoe is adjustable relative to a lengthwise direction of the prepreg layer.

11. The machine of claim 1, further comprising:
an inspection system including at least one of the following:
a gap detector configured to detect a through-thickness gap in the weld seam joining the prepreg piece to the prepreg layer; and
an overlap sensor configured to detect an overlap in the weld seam.

12. An off-axis prepreg material manufacturing machine, comprising:
a robot configured to position a prepreg piece adjacent to an end of a prepreg layer;
an alignment system configured to sense a position of the prepreg piece relative to the prepreg layer and generate a position signal representative thereof; and
a controller configured to receive the position signal and cause the robot to adjust the position of the prepreg piece such that an end edge of the prepreg piece and an end edge of the prepreg layer are in substantially abutting contact; and
a welding system having one or more welding shoes configured to be translated along a top surface of abutting end edges of the prepreg piece and prepreg layer and locally heat the abutting end edges and form a weld seam joining the prepreg piece to the prepreg layer.

13. A method of manufacturing an off-axis thermoplastic prepreg material roll, comprising the step of:
positioning, using a robot, a prepreg piece adjacent to an end of a prepreg layer;
sensing, using an alignment system, a position of the prepreg piece relative to the prepreg layer and generating a position signal representative thereof;
receiving, at a controller, the position signal from the alignment system;
adjusting, using the robot under command of the controller, the position of the prepreg piece such that an end edge of the prepreg piece and an end edge of the prepreg layer are in substantially abutting contact prior to forming a weld seam joining the prepreg piece to the prepreg layer; and
translating at least one welding shoe along a top surface of abutting end edges of the prepreg piece and prepreg layer for locally heating the abutting end edges and form the weld seam.

14. The method of claim 13, wherein the steps of sensing and adjusting the position of the prepreg piece comprise:
detecting, using a vision system, a location and orientation of an end edge of the prepreg piece relative to an end edge of the prepreg layer and generating the position signal representative thereof; and
adjusting, using the robot, the location and orientation of the prepreg piece such that the end edge of the prepreg piece and prepreg layer are in substantially abutting contact.

15. The method of claim 13, wherein the steps of sensing and adjusting the position of the prepreg piece comprise:
detecting, using a vision system, a location and orientation of a side edge of the prepreg piece relative to a side edge of the prepreg layer and generating the position signal representative thereof; and
adjusting, using the robot, the location and orientation of the prepreg piece such that the side edge of the prepreg piece and prepreg layer are aligned.

16. The method of claim 13, wherein:
the alignment system includes laser micrometers configured to measure the alignment of the end edge and/or side edge of the prepreg piece relative to the respective end edge and/or side edge of the prepreg layer.

17. The method of claim 13, further comprising:
picking up, using a vacuum head of the robot, an uppermost prepreg piece from a prepreg stack in an input hopper.

18. The method of claim 13, wherein the step of translating the at least one welding shoe along the top surface of abutting end edges comprises:
translating each of a pair of welding shoes from an approximate midpoint of a prepreg layer width toward one of opposing side edges of the prepreg piece and prepreg layer to form the weld seam joining the end edge of the prepreg piece to the end edge of the prepreg layer as a result of applying heat using the pair of welding shoes against the prepreg piece and prepreg layer.

19. The method of claim 18, further comprising:
supporting, using a backing anvil, the prepreg piece and prepreg layer against pressure applied onto the prepreg piece and prepreg layer by the welding shoe during forming of the weld seam.

20. The method of claim 13, further comprising:
clamping, using at least one clamp bar, at least one of the prepreg piece and the prepreg layer during welding of the end edges of the prepreg piece and the prepreg layer.

21. The method of claim 13, further comprising:
inspecting the weld seam for at least one of:
a through-thickness gap in the weld seam; and
an overlap of the weld seam.

22. The method of claim 13, wherein the step of forming the weld seam comprises
forming the weld seam along a direction non-perpendicular to a lengthwise direction of the prepreg layer and prepreg piece.

* * * * *